United States Patent
Lee et al.

(10) Patent No.: US 11,930,378 B2
(45) Date of Patent: Mar. 12, 2024

(54) APPARATUS AND METHOD FOR PERFORMING CALIBRATION IN WIRELESS COMMUNICATION SYSTEM

(71) Applicant: LG ELECTRONICS INC., Seoul (KR)

(72) Inventors: Jongpil Lee, Seoul (KR); Woochan Kim, Seoul (KR); Soo Jin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 17/326,030

(22) Filed: May 20, 2021

(65) Prior Publication Data
US 2022/0386146 A1    Dec. 1, 2022

(51) Int. Cl.
*H04W 24/02* (2009.01)
*H04B 17/11* (2015.01)
*H04B 17/21* (2015.01)
*H04L 5/14* (2006.01)
*H04W 72/21* (2023.01)
*H04W 72/23* (2023.01)

(52) U.S. Cl.
CPC ............ *H04W 24/02* (2013.01); *H04B 17/11* (2015.01); *H04B 17/21* (2015.01); *H04L 5/14* (2013.01); *H04W 72/21* (2023.01); *H04W 72/23* (2023.01)

(58) Field of Classification Search
CPC ..... H04W 24/02; H04W 72/21; H04W 72/23; H04B 17/11; H04B 17/21; H04B 17/0085; H04B 17/345; H04B 17/14; H04L 5/14; H04L 5/16
See application file for complete search history.

(56) References Cited

U.S. PATENT DOCUMENTS

2021/0135770 A1* 5/2021 Schober ................. H04L 5/003
2022/0182160 A1* 6/2022 Su ....................... H04L 27/2691

\* cited by examiner

*Primary Examiner* — Jae Y Lee
(74) *Attorney, Agent, or Firm* — LEE, HONG, DEGERMAN, KANG & WAIMEY

(57) ABSTRACT

Provided is a method performed by a user equipment (UE) in a wireless communication system. The method includes performing communication with a base station based on a full-duplex mode, transmitting, to the base station, a first message for requesting a duration for calibration of a circuit for analog self-interference cancellation (SIC), receiving, from the base station, a second message for allocating the duration, and performing the calibration of the circuit during the duration. Herein, during the duration, the UE is controlled to operate based on a half-duplex mode.

15 Claims, 24 Drawing Sheets

APPARATUS AND METHOD FOR PERFORMING CALIBRATION IN WIRELESS COMMUNICATION SYSTEM

BACKGROUND OF THE INVENTION

1. Field of the Invention

The present disclosure relates to a wireless communication system supporting full duplex radio (FDR), and, more particularly, to a method and apparatus for performing calibration in a wireless communication system.

2. Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication method of establishing a direct link between user equipments (UEs) and directly exchanging voice or data between the UEs without a base station (BS). SL is being considered as a method of solving the burden of the base station according to rapidly increasing data traffic.

In addition, the base station may allocate resources for uplink signals or resources for downlink signals to the UE or a vehicle. The base station may allocate the resources for the uplink signals to the UE or the vehicle through uplink control information (UCI) or allocate the resources for the downlink signals to the UE or the vehicle through downlink control information (DCI).

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY OF THE INVENTION

The present disclosure relates to a method and apparatus for efficiently performing calibration of a self-interference cancellation circuit in a wireless communication system.

The present disclosure relates to a method and apparatus for performing calibration during a resource duration allocated by a base station in a wireless communication system.

The present disclosure relates to a method and apparatus for reducing communication failure by calibration in a wireless communication system.

In one aspect, provided is a method performed by a user equipment (UE) in a wireless communication system. The method includes performing communication with a base station based on a full-duplex mode, transmitting, to the base station, a first message for requesting a duration for calibration of a circuit for analog self-interference cancellation (SIC), receiving, from the base station, a second message for allocating the duration, and performing the calibration of the circuit during the duration. Herein, during the duration, the UE is controlled to operate based on a half-duplex mode.

In another aspect, provided is a method performed by a base station in a wireless communication system. The method includes performing communication with a user equipment (UE) based on a full-duplex mode, receiving, from the UE, a first message for requesting a duration for calibration of a circuit for analog self-interference cancellation (SIC), and transmitting, to the UE, a second message for allocating the duration. Herein, during the duration, the UE is controlled to operate based on a half-duplex mode.

In still another aspect, provided is a user equipment (UE) in a wireless communication system. The UE includes a transceiver, and a processor coupled to the transceiver and configured to perform communication with a base station based on a full-duplex mode, transmit, to the base station, a first message for requesting a duration for calibration of a circuit for analog self-interference cancellation (SIC), receive, from the base station, a second message for allocating the duration, and
perform the calibration of the circuit during the duration. Herein, during the duration, the UE is controlled to operate based on a half-duplex mode.

In still another aspect, provided is a base station in a wireless communication system. The base station includes a transceiver, and a processor coupled to the transceiver and configured to: perform communication with a user equipment (UE) based on a full-duplex mode, receive, from the UE, a first message for requesting a duration for calibration of a circuit for analog self-interference cancellation (SIC), and transmit, to the UE, a second message for allocating the duration. Herein, during the duration, the UE is controlled to operate based on a half-duplex mode.

In still another aspect, provided is an apparatus. The apparatus includes one or more memories, and one or more processors functionally connected to the one or more memories. The one or more processors control the apparatus to perform communication with a base station based on a full-duplex mode, transmit, to the base station, a first message for requesting a duration for calibration of a circuit for analog self-interference cancellation (SIC), receive, from the base station, a second message for allocating the duration, and perform the calibration of the circuit during the duration. Herein, during the duration, the UE is controlled to operate based on a half-duplex mode.

In still another aspect, provided is a non-transitory computer readable medium (CRM) storing one or more instructions. The one or more instructions executable by one or more processors control a user equipment to perform communication with a base station based on a full-duplex mode, transmit, to the base station, a first message for requesting a duration for calibration of a circuit for analog self-interference cancellation (SIC), receive, from the base station, a second message for allocating the duration, and perform the calibration of the circuit during the duration. Herein, during the duration, the UE is controlled to operate based on a half-duplex mode.

The above-described aspects of the present disclosure are only some of the preferred embodiments of the present disclosure, and various embodiments reflecting the technical features of the present disclosure may be derived and understood by those of ordinary skill in the art based on the detailed description of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DESCRIPTION OF THE PREFERRED EMBODIMENTS

Figure 1:
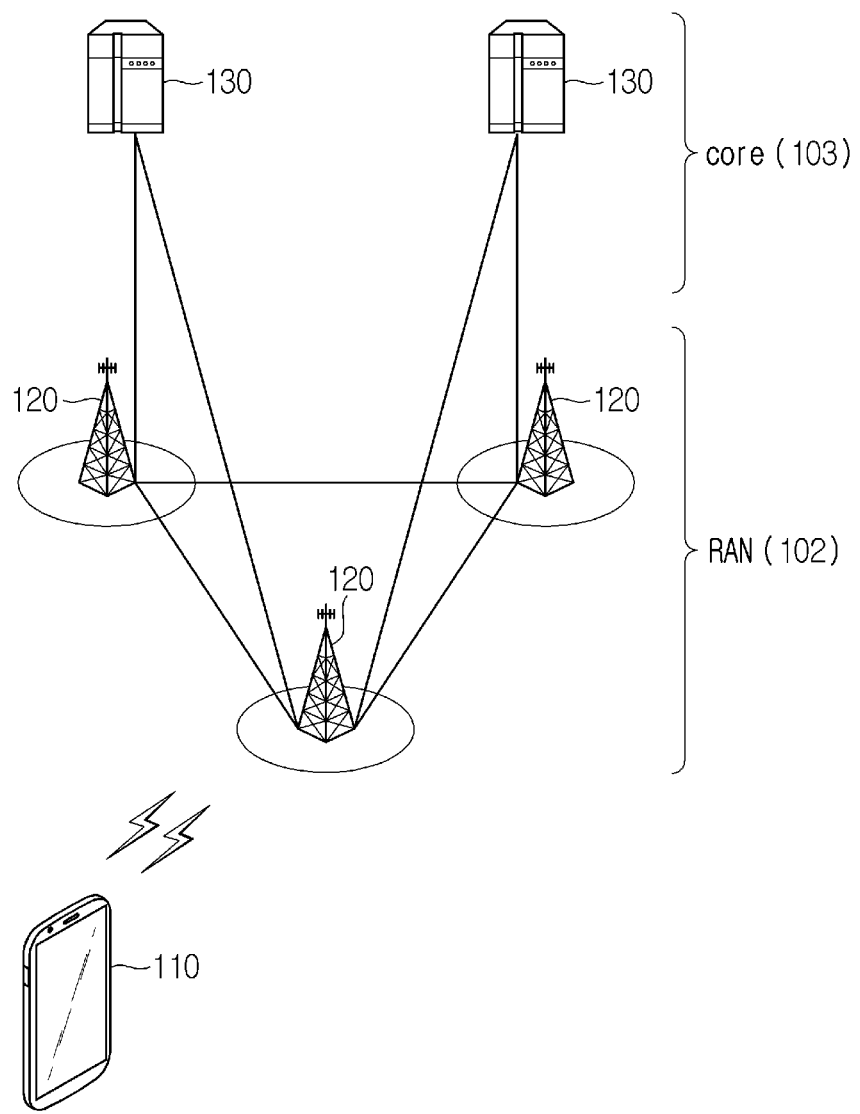
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, the following documents may be referenced.

(1) 3GPP LTE

3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol (2) 3GPP NR (e.g. 5G)

3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description Communication System Applicable to the Present Disclosure FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, a eNode B (eNB), a gNode B (gNB), a ng-eNB, an advanced base station (ABS) or an access point (AP), abase transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Figure 2:
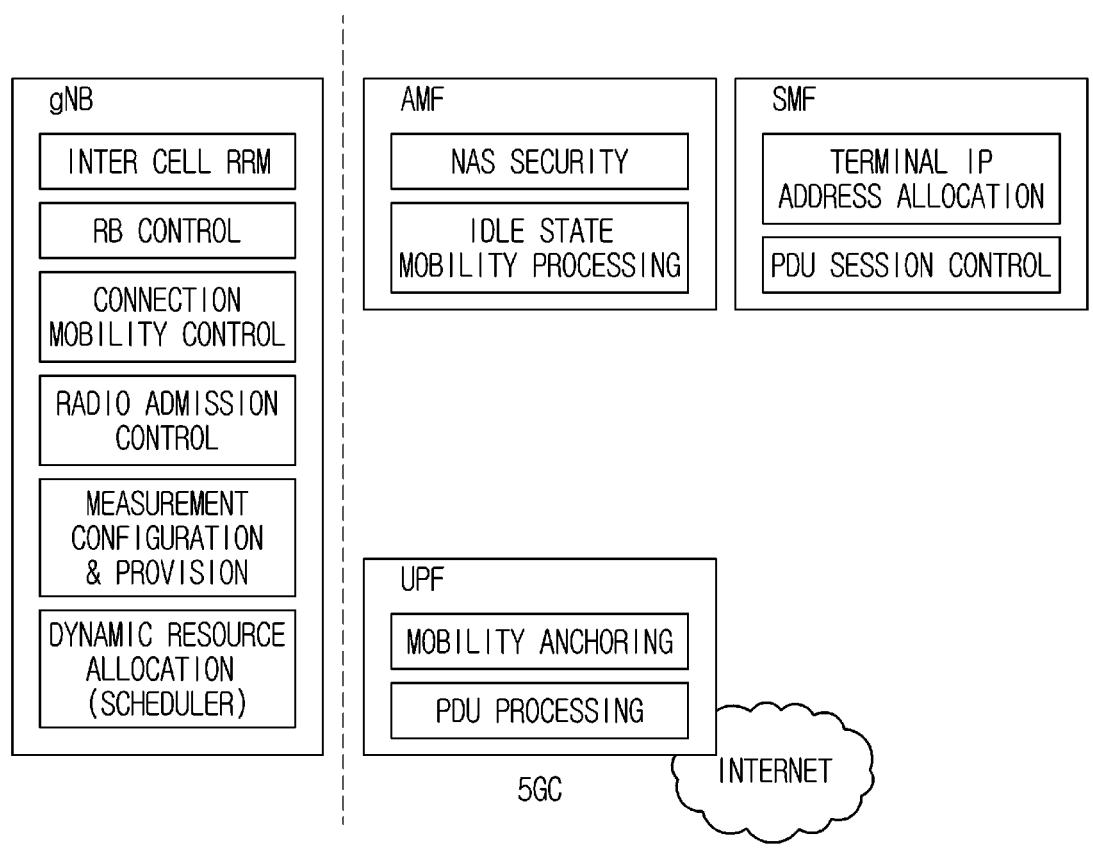
FIG. 2 illustrates functional division between NG-RAN and 5GC according to an embodiment of the present disclosure.

FIG. 2 illustrates functional division between NG-RAN and 5GC according to an embodiment of the present disclosure. The embodiment of FIG. 2 may be combined with various embodiments of the present disclosure.

Referring to FIG. 2, a gNB may provide functions such as inter cell radio resource management (RRM), radio bearer control, connection mobility control, radio admission control, measurement configuration & provision, dynamic resource allocation or the like. The AMF may provide functions such as non access stratum (NAS) security and idle state mobility processing. The UPF may provide functions such as mobility anchoring, protocol data unit (PDU) processing or the like. The SMF may provide functions such as terminal Internet protocol (IP) address allocation, PDU session control or the like.

Radio interface protocol layers between a terminal and a network may be classified into Layer 1 (L1), Layer 2 (L2) and Layer 3 (L3) based on the three sublayers of the open system interconnection (OSI) reference model that is well known in the communication system. Among them, a physical layer belonging to Layer 1 provides an information transfer service using a physical channel and a radio resource control (RRC) layer located on Layer 3 is responsible for controlling radio resources between a terminal and a network. To this end, the RRC layer enables exchange of an RRC message between a terminal and a network.

Figure 3A:
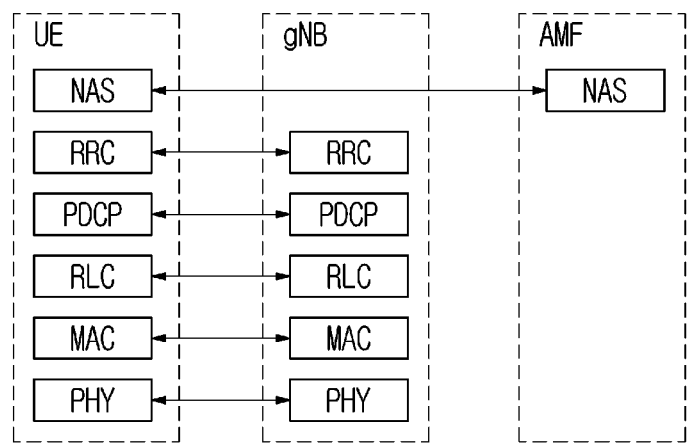
FIGS. 3A and 3B illustrate radio protocol architectures according to an embodiment of the present disclosure.
Figure 3B:
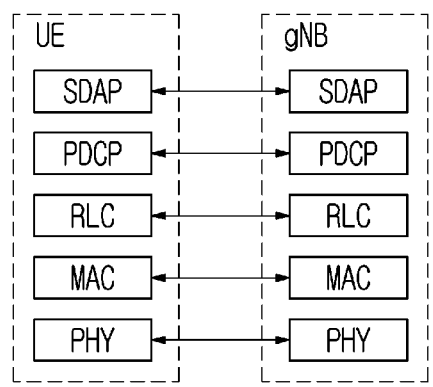

FIGS. 3A and 3B illustrate protocol architectures according to an embodiment of the present disclosure. The embodiment of FIGS. 3A and 3B may be combined with various embodiments of the present disclosure. Specifically, FIG. 3A shows a radio protocol structure for a user plane and FIG. 3B shows a radio protocol structure for a control plane. The user plane is a protocol stack for user data transmission and the control plane is a protocol stack for control signal transmission.

Referring to FIGS. 3A and 3B, a physical layer provides an information transfer service to a higher layer using a physical channel. The physical layer is connected to a Medium Access Control (MAC) layer located on a higher layer via a transport channel. Data is transported between the MAC layer and the physical layer via the transport channel. The transport channel is classified according to how data is transmitted via a radio interface with what characteristics.

Data is also transported between different physical layers, that is, the physical layers of a transmitter and a receiver, via a physical channel. The physical channel may be modulated using an Orthogonal Frequency Division Multiple Access (OFDMA) scheme, and uses a time and a frequency as radio resources.

A Medium Access Control (MAC) layer provides a service to a Radio Link Control (RLC) layer of a higher layer via a logical channel. The MAC layer provides a mapping function from a plurality of logical channel to a plurality of transport channels. In addition, the MAC layer provides a logical channel multiplexing function by mapping from a plurality of logical channels to a single transport channel. A MAC sublayer provides a data transmission service on a logical channel.

A radio link control (RLC) layer performs concatenation, segmentation and reassembly of an RLC service data unit (SDU). In order to ensure a variety of quality of service (QoS) required by a radio bearer (RB), the RLC layer provides three operation modes such as a transparent mode (TM), an unacknowledged mode (UM) and an acknowledged mode (AM). AM RLC provides error correction through automatic repeat request (ARQ).

A Radio Resource Control (RRC) layer is defined only in the control plane. The RRC layer is responsible for control of logical, transport, and physical channels in association with configuration, re-configuration, and release of Radio Bearers (RBs). The RB means a logical path provided by Layer 1 (the physical layer or the PHY layer) and Layer 2 (the MAC layer, the RLC layer or the packet data convergence protocol (PDCP) layer) for data transfer between a UE and a network.

The functions of the PDCP layer in the user plane include user data transfer, header compression and ciphering. The functions of the PDCP layer in the control plane include control plane data transfer and ciphering/integrity protection.

A service data adaptation protocol (SDAP) layer is defined only in the user plane. The SDAP layer performs mapping between QoS flow and data radio bearer and QoS flow identifier (ID) marking in uplink and downlink packets.

Configuring a RB means a process of defining characteristics of a radio protocol layer and channel to provide a specific service and setting specific parameters and operation methods. The RB may be subdivided into a signaling radio bearer (SRB) and a data radio bearer (DRB). The SRB is used as a path for transmitting an RRC message in the control plane and the DRB is used as a path for transmitting user data in the user plane.

When RRC connection is established between the RRC layer of a terminal and the RRC layer of the base station, the UE may be in a RRC_CONNECTED mode, and, otherwise, the UE may be in a RRC_IDLE mode. In the case of NR, a RRC_INACTIVE state is further defined, and the UE in the RRC_INACTIVE mode may maintain connection with the core network but release connection with the base station.

Examples of a downlink transmission channel for transmitting data from a network to a terminal include a broadcast channel (BCH) for transmitting system information and a downlink shared channel (SCH) for transmitting user traffic or a control message. A control message or traffic of a downlink multicast or broadcast service may be transmitted via a downlink SCH or via a separate downlink multicast channel (MCH). Meanwhile, examples of an uplink transmission channel for transmitting data from a terminal to a network include a random access channel (RACH) for transmitting an initial control message and an uplink shared channel (SCH) for transmitting user traffic or a control message.

Examples of a logical channel located above a transport channel and mapped to the transport channel include a Broadcast Control Channel (BCCH), a Paging Control Channel (PCCH), a Common Control Channel (CCCH), a Multicast Control Channel (MCCH), a Multicast Traffic Channel (MTCH) and the like.

The physical channel consists of a plurality of OFDM symbols in the time domain and a plurality of subcarriers in the frequency domain. One subframe consists of a plurality of OFDM symbols in the time domain. The resource block is a resource allocation unit and consists of a plurality of OFDM symbols and a plurality of subcarriers. In addition, each subframe may use specific subcarriers of specific OFDM symbols (e.g., a first OFDM symbol) of the corresponding subframe for a physical downlink control channel (PDCCH), that is, an L1/L2 control channel. A Transmission Time Interval (TTI) is a unit time for subframe transmission.

Radio Resource Structure

Figure 4:
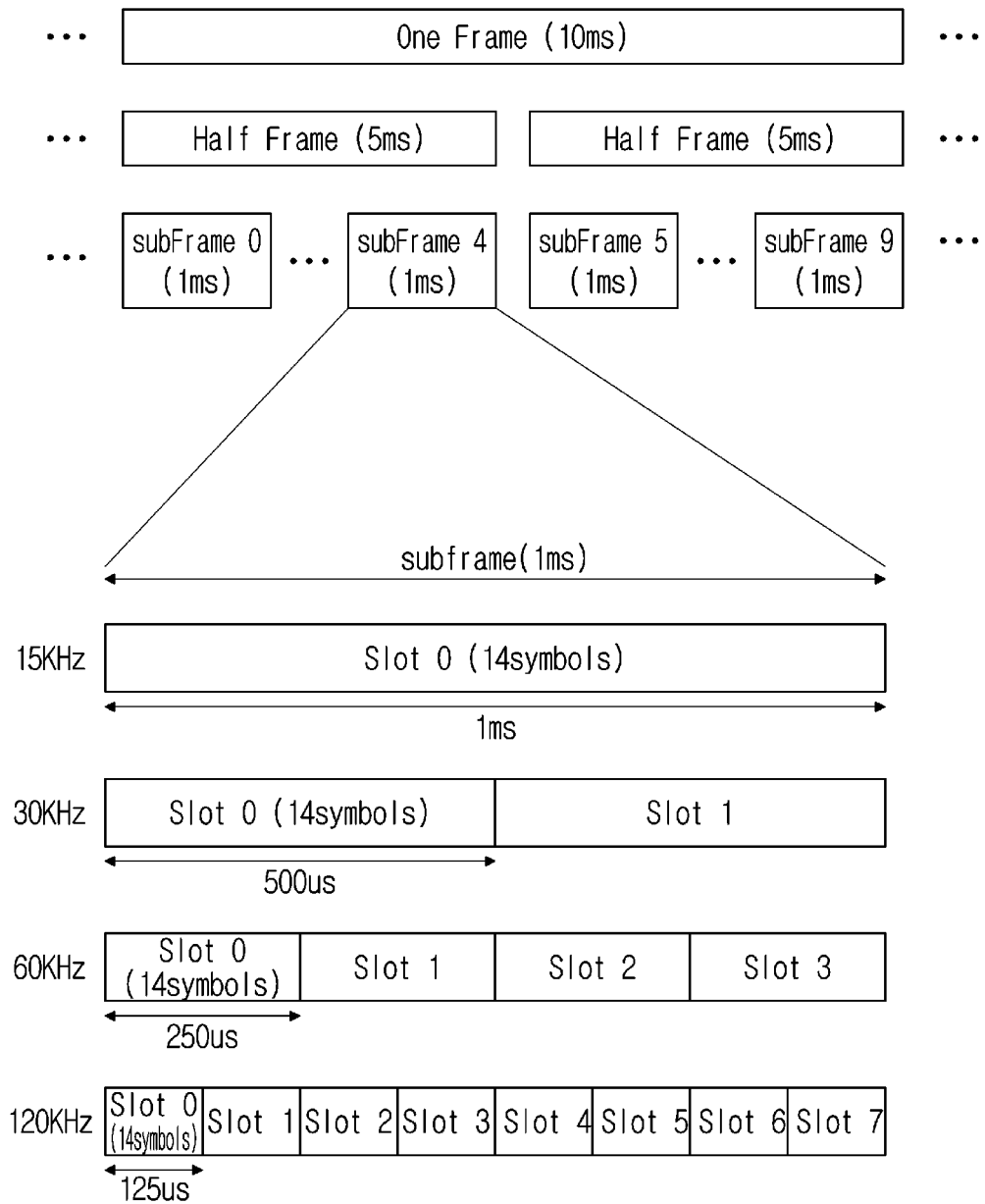
FIG. 4 illustrates the structure of a radio frame of NR according to an embodiment of the present disclosure.

FIG. 4 illustrates the structure of a radio frame of NR according to an embodiment of the present disclosure. The embodiment of FIG. 4 may be combined with various embodiments of the present disclosure.

Referring to FIG. 4, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N^{slot}_{symb}$ of symbols per slot, the number $N^{frame,\mu}_{slot}$ of slots per frame and the number $N^{subframe,\mu}_{slot}$ of slots per subframe may vary according to the SCS configuration (u). For example, SCS (=15*2^μ), $N^{slot}_{symb}$, $N^{frame,\mu}_{slot}$, and $N^{subframe,\mu}_{slot}$ may be 15 KHz, 14, 10 and 1 in the case of may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*2^μ), $N^{slot}_{symb}$, $N^{frame,\mu}_{slot}$ and $N^{subframe,\mu}_{slot}$ may be 60 KHz, 12, 40 and 4 in the case of u=2. In the NR system, an OFDM(A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 5:
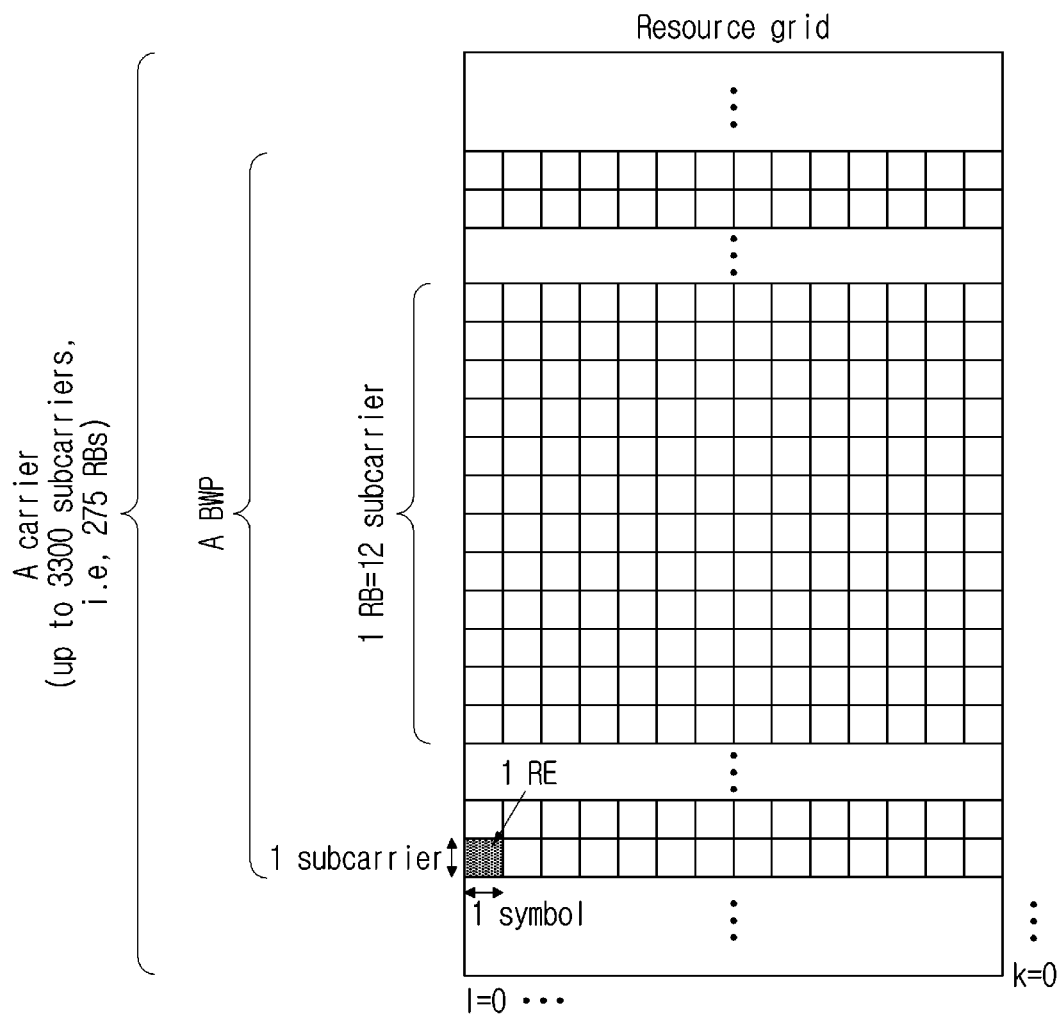
FIG. 5 illustrates a slot structure of an NR frame according to an embodiment of the present disclosure.

FIG. 5 illustrates a slot structure of an NR frame according to an embodiment of the present disclosure. The embodiment of FIG. 5 may be combined with various embodiments of the present disclosure.

Referring to FIG. 5, a slot includes a plurality of symbols in the time domain. For example, one slot includes 14 symbols in the case of the normal CP and may include 12 symbols in the case of the extended CP. Alternatively, one slot may include 7 symbols in the case of the normal CP and may include 6 symbols in the case of the extended CP.

A carrier includes a plurality of subcarriers in the frequency domain. A resource block (RB) may be defined as a plurality (e.g., 12) of consecutive subcarriers in the frequency domain. A bandwidth part (BWP) may be defined as a plurality of consecutive (physical) resource blocks ((P)RBs) in the frequency domain, and correspond to one numerology (e.g., SCS, CP length, etc.). The carrier may include a maximum of N (e.g., 5) BWPs. Data communication may be performed through an activated BWP. Each element may be referred to as a resource element (RE) in the resource grid and one complex symbol may be mapped.

Meanwhile, a radio interface between terminals and a radio interface between a terminal and a network may consist of Layer L1, Layer L2 and Layer L3. In various embodiments of the present disclosure, Layer L1 may mean a physical layer. In addition, for example, Layer L2 may mean at least one of a MAC layer, an RLC layer, a PDCP layer or an SDAP layer. In addition, for example, Layer L3 may mean an RRC layer.

In a radio access system, a terminal receives information from a base station through a downlink and transmit information to the base station through an uplink. Information transmitted and received by the base station and the terminal may include general data information and a variety of control information, and various physical channels are present according to the type/usage of the transmitted/received information.

Figure 6:
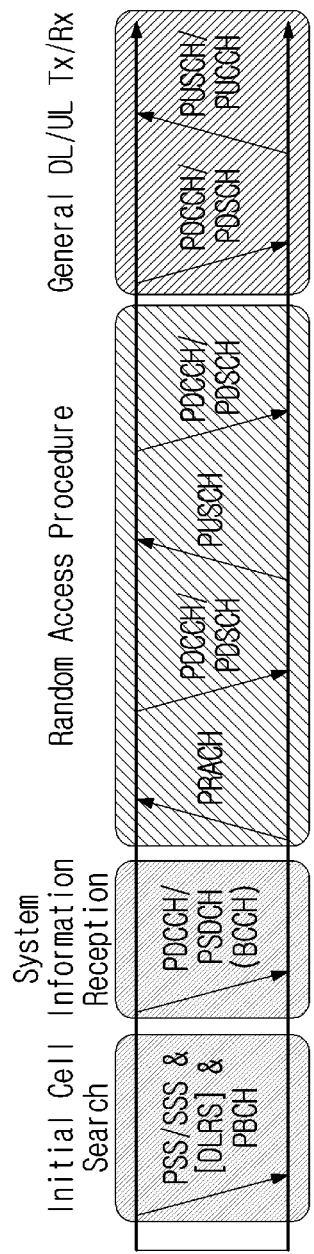
FIG. 6 illustrates signal transmission through physical channels according to an embodiment of the present disclosure.

FIG. 6 illustrates signal transmission through physical channels according to an embodiment of the present disclosure.

Referring to FIG. 6, when a UE is powered on or enters a new cell, the UE performs an initial cell search operation such as synchronization with a base station. Specifically, the UE may receive a primary synchronization channel (P-SCH) and a secondary synchronization channel (S-SCH) from the base station, synchronize with the eNB and acquire information such as a cell ID. Thereafter, the UE may receive a physical broadcast channel (PBCH) signal from the base station and acquire inter cell broadcast information. Meanwhile, the UE may receive a downlink reference signal (DL RS) and confirm a downlink channel state in the initial cell search step.

The UE, which has completed initial cell search, performs system information reception operation. The UE may acquire more detailed system information, by receiving a physical downlink control channel (PDCCH) and a physical downlink control channel according to the PDCCH information.

Thereafter, the UE may perform a random access procedure in order to complete access to the base station. To this end, the UE may transmit a preamble through a physical random access channel (PRACH) and receive a random access response (RAR) for the preamble through a PDCCH and a PDSCH corresponding thereto. The UE may transmit a physical uplink shared channel (PUSCH) using scheduling information in the RAR and perform a contention resolution procedure such as reception of a PDCCH signal and a PDSCH signal corresponding thereto.

Meanwhile, the random access procedure is performed in two steps, preamble transmission and PUSCH transmission of the UE are performed as one operation, and RAR transmission and PDSCH transmission of the base station may be performed as one operation.

Thereafter, the UE may perform reception of a PDCCH signal and/or a PDSCH signal or may perform reception of a PUSCH signal and/or transmission of a PUCCH signal, as a general uplink/downlink signal transmission procedure.

Control information transmitted from the UE to the base station is referred to as uplink control information (UCI). The UCI includes Hybrid Automatic Repeat and reQuest (HARQ) Acknowledgement/Negative-Acknowledgement (ACK/NACK), Scheduling Request (SR), Channel Quality Indication (CQI), Precoding Matrix Indication (PMI), Rank Indication (RI) information, etc. In general, the UCI is periodically transmitted through a PUCCH, but may be transmitted through a PUSCH when control information and data need to be simultaneously transmitted. In addition, the UE may aperiodically transmit the UCI through the PUSCH according to the request/instruction of a network.

Figure 7:
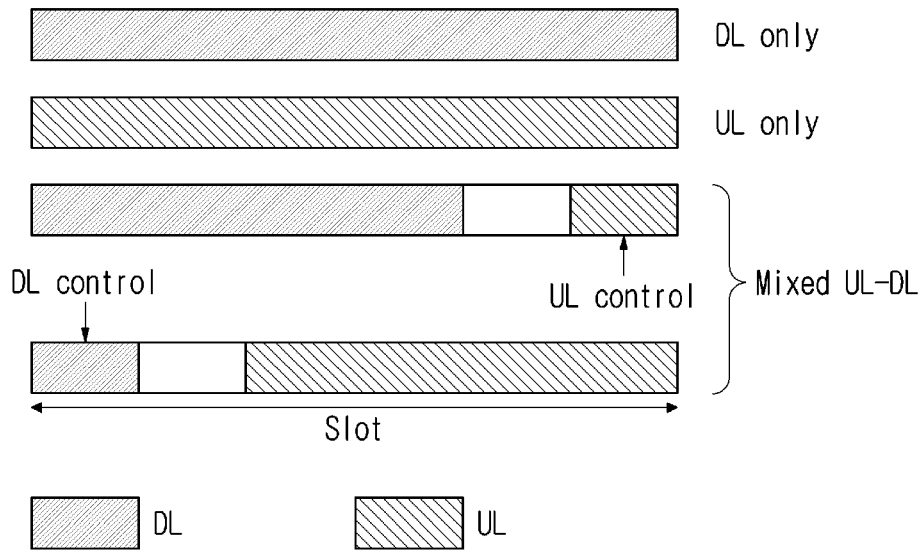
FIG. 7 illustrates the structure of a self-contained slot according to an embodiment of the present disclosure.

FIG. 7 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered. Durations was listed in chronological order.

1. DL only configuration
2. UL only configuration
3. Mixed UL-DL configuration
   DL region+GP (Guard Period)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Figure 8:
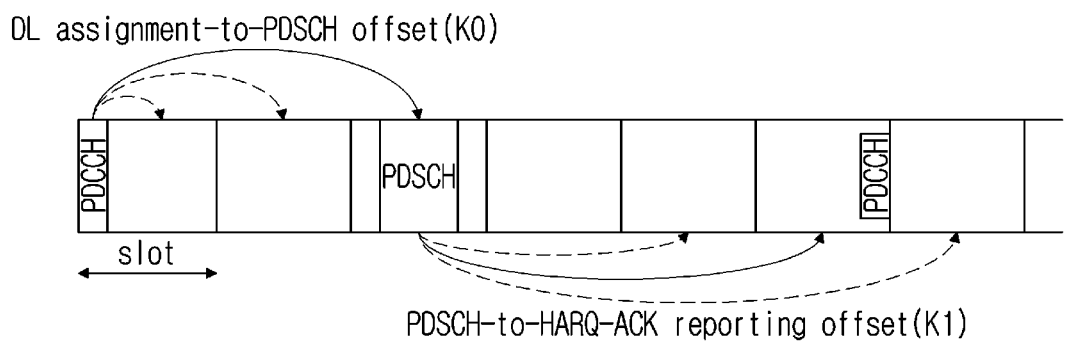
FIG. 8 illustrates an acknowledge (ACK)/negative ACK (HACK) transmission procedure according to an embodiment of the present disclosure.

FIG. 8 illustrates an ACK/NACK transmission procedure according to an embodiment of the present disclosure.

Referring to FIG. 8, a UE may detect a PDCCH in slot #n. Here, the PDCCH includes downlink scheduling information (e.g., DCI format 1_0 and 1_1), and PDCCH indicates DL assignment-to-PDSCH offset (K0) and PDSCH-HARQ-ACK reporting offset (K1). For example, DCI format 1_0 and 1_1 may include the following information.

Frequency domain resource assignment: This indicates an RB set assigned to a PDSCH.

Time domain resource assignment: K0, This indicates the start position (e.g., OFDM symbol index) and length (e.g., the number of OFDM symbols) of a PDSCH in a slot.

PDSCH-to-HARQ_feedback timing indicator: This indicates K1.

Thereafter, the UE may receive a PDSCH in slot #(n+K0) according to scheduling information related to slot #n and then transmit UCI through a PUCCH in slot #(n+K1). Here, the UCI includes HARQ-ACK response to the PDSCH. When the PDSCH is configured to transmit a maximum of 1 TB, the HARQ-ACK response may consist of 1 bit. When the PDSCH is configured to transmit a maximum of two TBs, the HARQ-ACK response may consist of 2 bits when spatial bundling is not configured and may consist of 1 bit when spatial bundling is configured. When a HARQ-ACK transmission time point for a plurality of PDSCHs is designated as slot #(n+K1), the UCI transmitted in slot #(n+K1) includes a HARQ-ACK response to the plurality of PDSCHs.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless terminal, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 9:
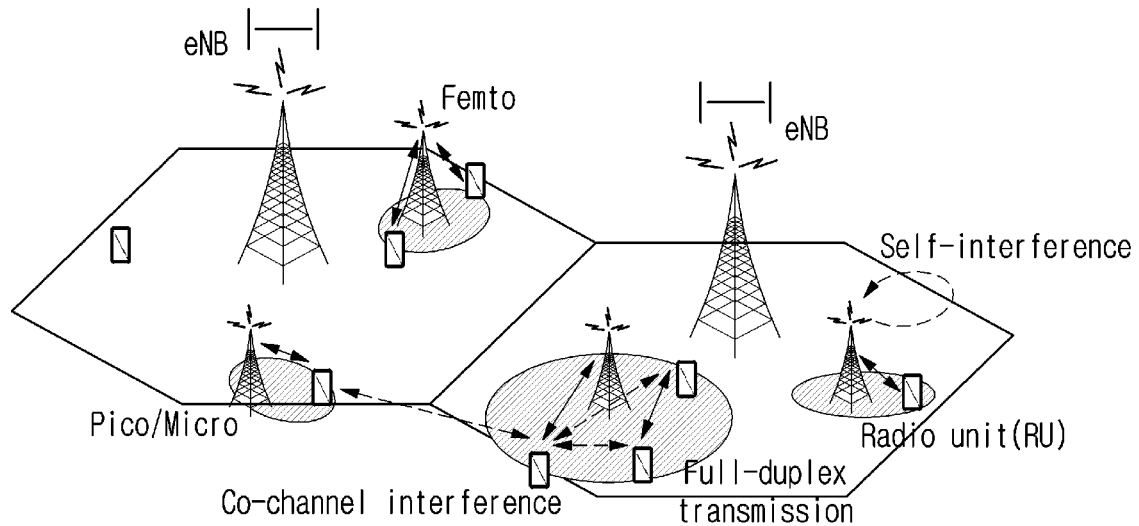
FIG. 9 illustrates the concept of a user equipment (UE) and a base station supporting full duplex radio (FDR) according to an embodiment of the present disclosure.

FIG. 9 illustrates the concept of a user equipment (UE) and a base station supporting full duplex radio (FDR) according to an embodiment of the present disclosure. In the FDR situation shown in FIG. 9, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 10:
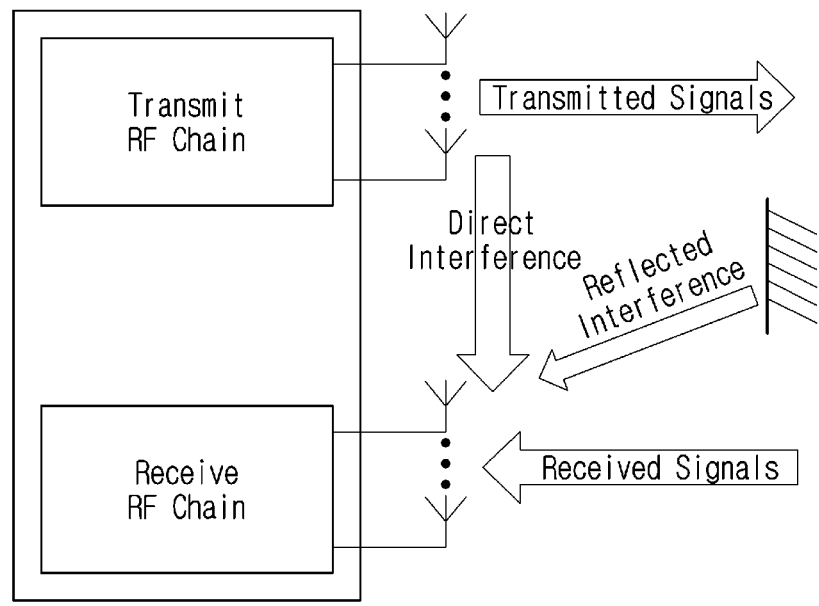
FIG. 10 illustrates an example of transmit/receive link and self-interference in a FDR communication situation according to an embodiment of the present disclosure.

FIG. 10 illustrates an example of transmit/receive link and self-interference in a FDR communication situation according to an embodiment of the present disclosure.

As shown in FIG. 10, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{O,BW} = -174$ dBm$+10 \times \log_{10}(BW)$, and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

antenna self-IC: This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

analog self-IC: This is a technique that cancels interference at an analog end before a received signal passes through an analog-to-digital converter (ADC) and cancels SI signals using a duplicated analog signal. This may be performed in an RF domain or an IF domain.

A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

digital self-IC: This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 11:
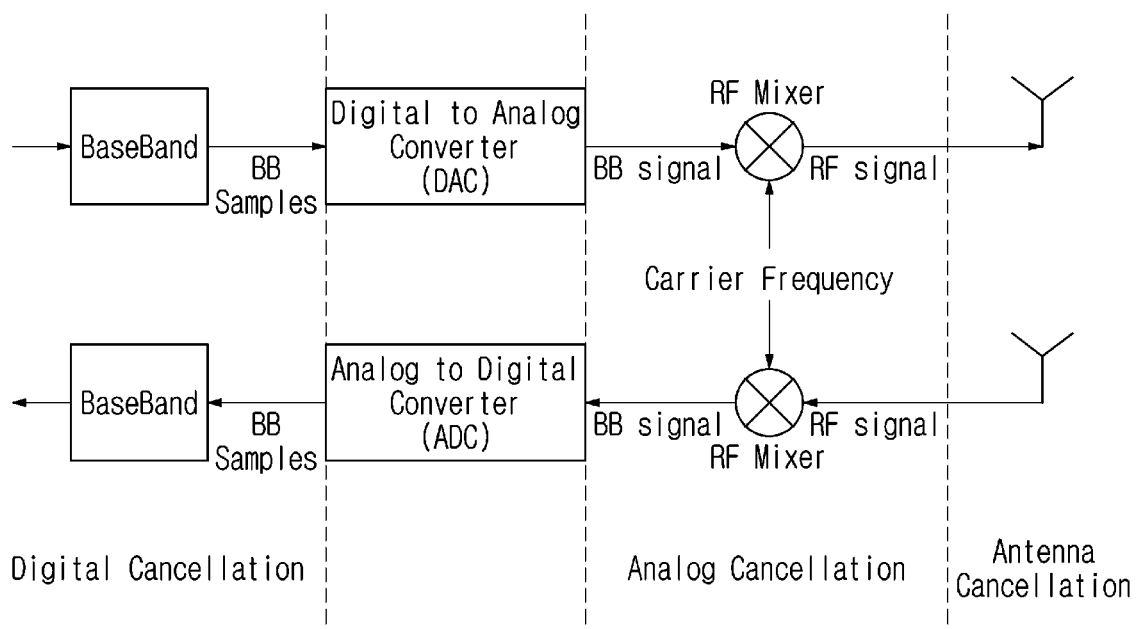
FIG. 11 illustrates a position, to which three interference techniques at a radio frequency (RF) front end is applied, according to an embodiment of the present disclosure.

Positions, to which the above-described three self-interference cancellation techniques are applied, are shown in FIG. 11. FIG. 11 illustrates positions, to which three interference techniques at a radio frequency (RF) front end is applied, according to an embodiment of the present disclosure. Referring to FIG. 11, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 12:
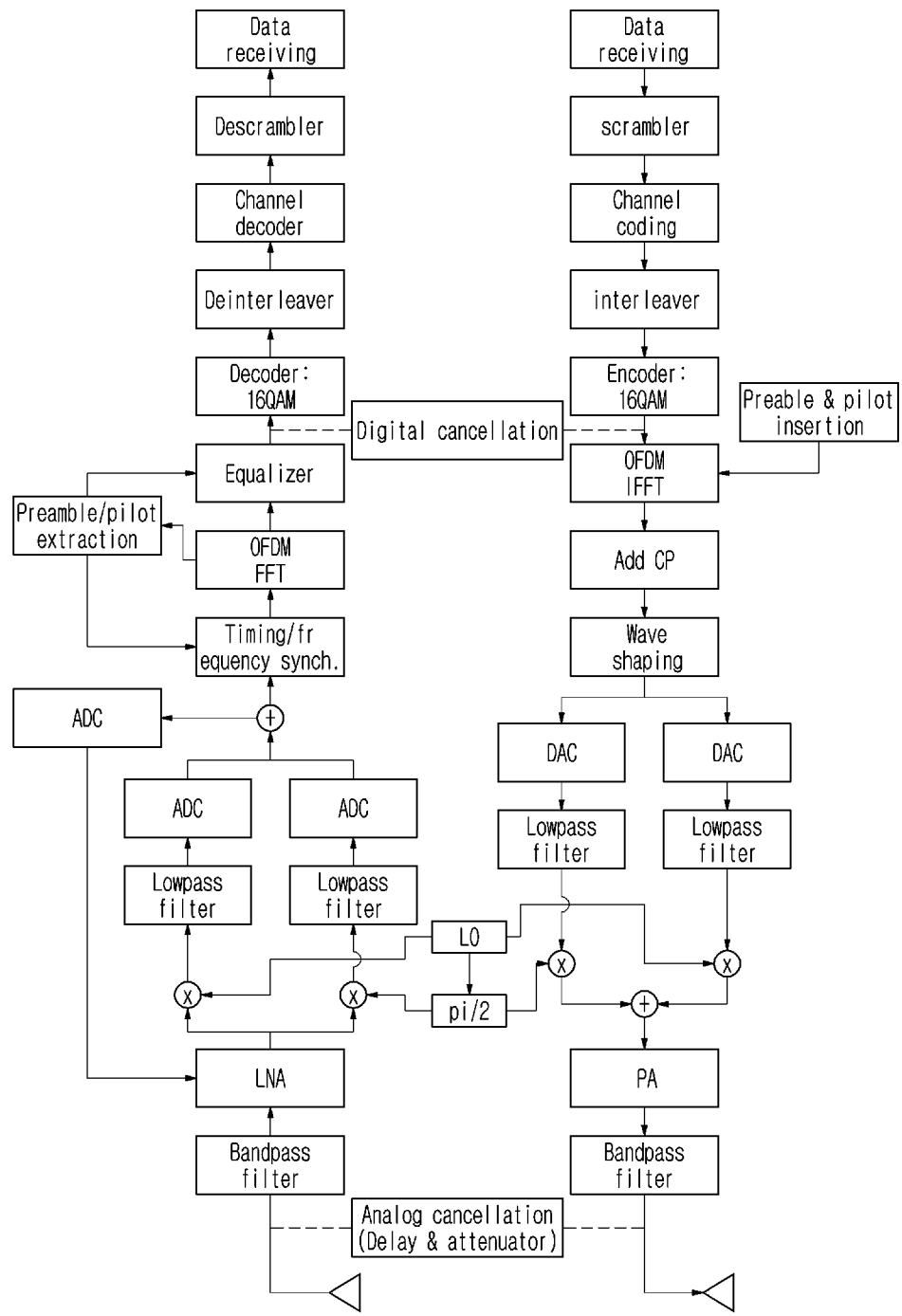
FIG. 12 illustrates the structure of a transceiver for self-interference cancellation in a communication device according to an embodiment of the present disclosure.

FIG. 12 illustrates the structure of a transceiver for self-interference cancellation in a communication device according to an embodiment of the present disclosure. In FIG. 12, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 12 shows a structure for canceling a self-interference signal by separating a transmit antenna and a receiver antenna, an antenna interference cancellation technique using one antenna may be used in another example. In this case, the antenna structure may be different from the example of FIG. 12. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{Equation (1)}$$

In Equation 1, y(n) denotes a received signal, $h_D(n)$ denotes a channel experienced by desired data, $x_D(n)$ denotes desired data to be received, $h_{SI,k}(n)$ denotes a self-channel experienced by transmitted data, $x_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} (h_{SI,k}(n) - \hat{h}_{SI,k}(n)) * |x_{SI}(n)|^{k-1} x_{SI}(n) + z(n)}_{\text{Residual SI}}, \quad \text{Equation (2)}$$

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Thereafter, a result of decoding the received signal using the gain of the estimated desired channel is shown in Equation 3 below.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} \quad \text{Equation (3)}$$

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

$$z'(n) = \sum_{\substack{k=1,\ldots,K \\ k=odd}} (h_{SI,k}(n) - \hat{h}_{SI,k}(n)) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Figure 13:
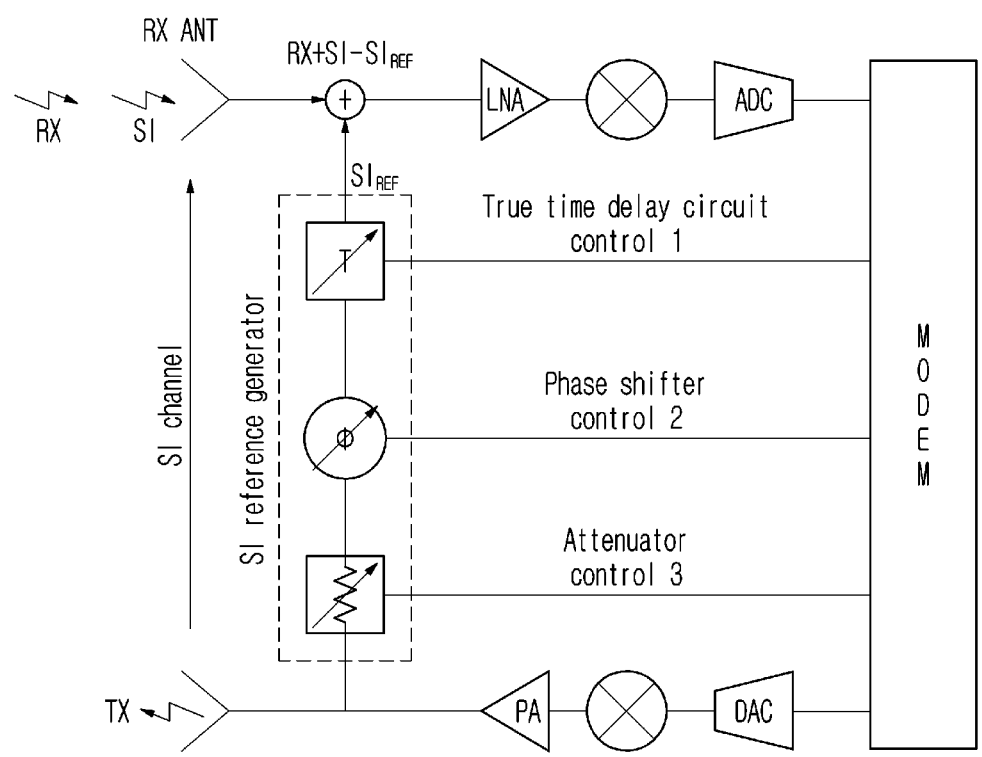
FIG. 13 illustrates an example of an RF chain of a communication device for self-interference signal cancellation according to an embodiment of the present disclosure.

FIG. 13 illustrates an example of an RF chain of a communication device for self-interference signal cancellation according to an embodiment of the present disclosure.

In order to cancel a self-interference signal in a communication device using a FDR method, a duplicated signal equal to the self-interference signal (hereinafter referred to as a "self-interference reference signal") is necessary. Referring to FIG. 13, in order to cancel the self-interference signal, a method of subtracting a self-interference reference signal $SI_{REF}$ from a self-interference signal before the LNA of a receive chain is generally used. In this case, in order to generate the self-interference reference signal $SI_{REF}$ in the communication device, a transmitted signal of a transmission end is branched. In the example of FIG. 13, a TX signal is branched after passing through a PA in the transmission end. A portion of the branched transmitted signal passes through an SI reference generator including an attenuator, a phase shifter and a time delay circuit. A self-interference reference generator mimics a self-interference channel and generates a self-interference reference signal $SI_{REF}$ from the branched transmitted signal. In this case, a channel experienced by the self-interference signal is separately estimated such that the self-interference reference generator mimics the self-interference channel.

First, the communication device may generate a control signal for the time delay circuit, a control signal for the phase shifter and a control signal for the attenuator, after estimating the self-interference channel. In this case, a desired RX signal should not be input to a self-interference reference signal path.

There are two methods for controlling the self-interference reference generator by the communication device. As a first method, the communication device may stop communication and transmit a signal for estimating a self-interference channel (e.g., a pilot signal or a reference signal) in an allocated communication band or channel band in order to separately estimate a channel, into which a self-interference signal is introduced, and the self-interference reference generator may mimic a self-interference signal based on information on the signal for estimating the self-interference channel during communication. As a second method, the communication device may transmit a signal for estimating a self-interference signal channel (e.g., a reference signal, a pilot signal or a tone) at both ends of a communication channel band (e.g., guard bands) and control the self-interference reference generator to reduce the signal for estimating the self-interference signal channel according to an adaptive feedback algorithm.

In the first method, in order to find the optimized state of the self-interference reference generator, it is first necessary to estimate the self-interference channel. To this end, a transmission device and a reception device should stop communication. Moreover, even if complete self-interference channel is performed, very accurate calibration of a self-interference reference path is required. The channel of the self-interference reference path is preferably represented by a look-up table based on a combination of all control voltages. Even if an accurate look-up table is created at a specific transmit power and temperature, this is changed according to the original Tx power and the temperature of the circuit. Therefore, self-interference signal cancellation performance may deteriorate due to calibration measurement errors and a difference between current transmit power and temperature and conditions when the look-up table is created. In addition, the first method cannot follow the self-interference signal channel varying over time.

In the second method, since the communication device transmits the signal for estimating the self-interference signal channel (e.g., a tone, a pilot signal, a reference signal, etc.) at both sides of the communication band, communication may not be stopped. In addition, in the second method, since the self-interference reference generator is controlled using an adaptive feedback algorithm in a time-continuous manner, calibration of the self-interference reference generator is unnecessary. However, since the self-interference reference generator is controlled using guard bands at the both sides of the communication band instead of the communication band, a self-interference signal may not be canceled due to transmission of a tone inside the most important communication band.

Figure 14:
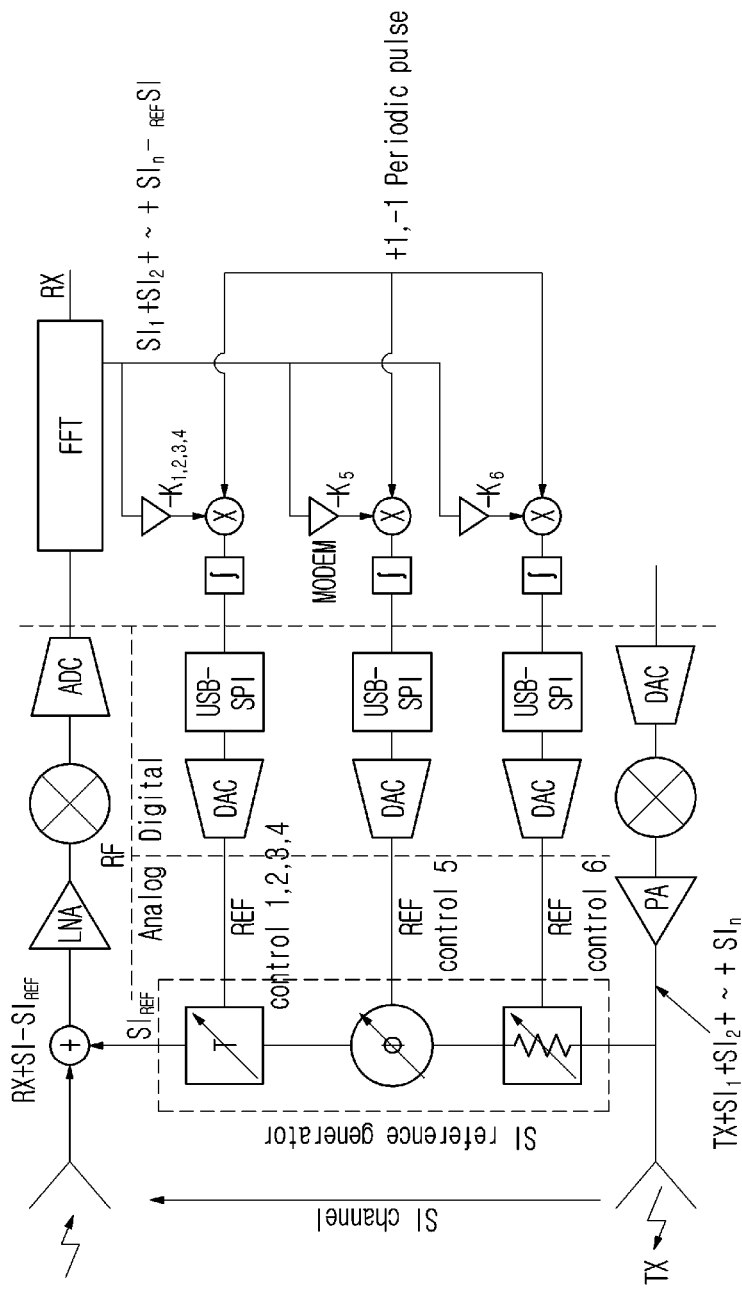
FIG. 14 illustrates another example of an RF chain of a communication device for self-interference signal cancellation according to another embodiment of the present disclosure.

FIG. 14 illustrates another example of an RF chain of a communication device for self-interference signal cancellation according to another embodiment of the present disclosure.

Referring to FIG. 14, the RF chain of the communication device may include a communication modem, a self-interference reference generator, a Tx antenna, an Rx antenna, etc. The communication modem may include a fast Fourier transform (FFT) block and integrators. The self-interference reference generator may include an attenuator, a phase shifter and a time delay circuit.

The self-interference reference generator may control the attenuator, the phase shifter and the time delay circuit in an analog manner in order to generate or duplicate an precise self-interference reference signal. To this end, the RF chain may include at least one DAC for converting a control signal transmitted from a communication mode into an analog signal.

Based on the concept of the time delay circuit basically defined as phase shift versus the slope of a frequency band, it is impossible to control time delay with only information at one a single frequency. Accordingly, in order to perform self-interference signal cancellation in a wide band, information at at least two frequencies is required, such that two or more pilot signals, two or more reference signals or two or more tones may be transmitted as test signals.

In order to control the self-interference reference generator, multi-reference signals, multi-tones or multi-pilot signals may be used as test signals. First, in FIG. 14, the communication modem may monitor a power sum of multi-tones at a frequency at which the multi-tones as the test signals are located and measure power of each multi-tone at a frequency location where the multi-tones are transmitted, thereby calculating a sum of powers. Here, power measured at the frequency location of the transmitted tone corresponds to the power of the self-interference signal.

The communication modem may transmit a control signal such that a difference between a power sum of self-interference signals due to the multi-tones and the power of the self-interference reference signal is minimized. That is, the communication modem may feed the control signal back to the self-interference reference generator such that the sum of the powers of the self-interference signals due to the multi-tones is minimized. The self-interference reference generator generates a self-interference reference signal according to the fed-back control signal. In order to remove the measured power sum of the self-interference signals, the communication modem may generate a self-interference reference signal with power closest to the power sum.

The communication modem may control the self-interference reference generator until the power sum $SI=SI_1=SI_2+SI_3+ \ldots +SI_n$ of the self-interference signals is minimized using an adaptive feedback loop. Here, $SI_n$ is power of the self-interference signal measured at a frequency location where an n-th reference signal of a plurality of reference signals is transmitted. The communication modem uses a periodic pulse signal of +1 and −1 such that the sign of the increment of a bias voltage controlled by the loop function of adaptive feedback is changed. Here, the loop function means a function for searching around a current variable in the feedback loop including a variable to be controlled.

The communication modem may feed the control signal back to the phase shifter, the attenuator and the time delay circuit using the adaptive feedback loop, such that the self-interference reference generator generates a self-interference reference signal with power closest to the power sum of the self-interference signals.

The method of controlling generation of the self-interference reference signal described with reference to FIG. 14 has an advantage that complicated channel estimation and calibration are unnecessary because the adaptive feedback algorithm operates with only the power sum of the multi-tones.

Figure 15:
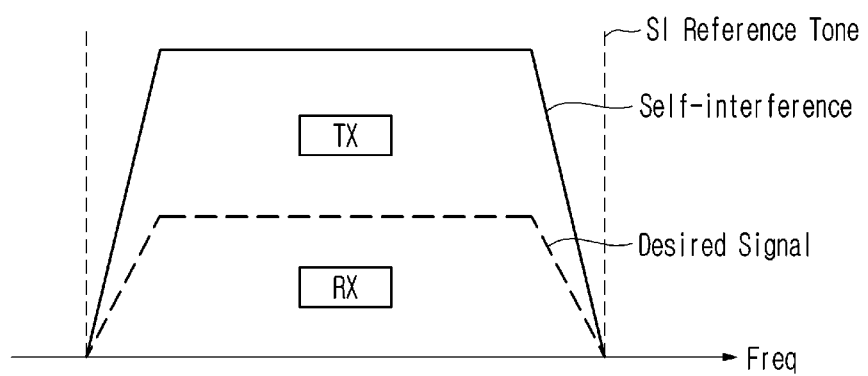
FIG. 15 illustrates examples of two tones used to generate a self-interference reference signal according to an embodiment of the present disclosure.

FIG. 15 illustrates examples of two tones used to generate a self-interference reference signal according to an embodiment of the present disclosure. FIG. 15 shows two tones transmitted at both sides (e.g., guard bands) of the communication band in order to control the self-interference reference generator of FIG. 13 or 14.

Referring to FIG. 15, tones for estimating the self-interference signal channel may be transmitted at the guard bands located at both ends of the communication channel band and the self-interference reference generator may be controlled to reduce tones according to the adaptive feedback algorithm. In this case, a desired signal, from which self-interference is canceled, may be stably received.

Detailed Embodiments of the Present Disclosure

The present disclosure relates to technology for maintaining performance of a circuit for canceling self-interference (SI) in a wireless communication system supporting the FDR. Specifically, the present disclosure describes various embodiments for calibrating a self-interference cancellation circuit. That is, the present disclosure proposes a communication mechanism for quickly re-entering an FDR mode by performing re-calibration of an analog-self interference cancellation module. Hereinafter, the FDR mode may be referred to as a "full-duplex (FD) mode".

Figure 16:
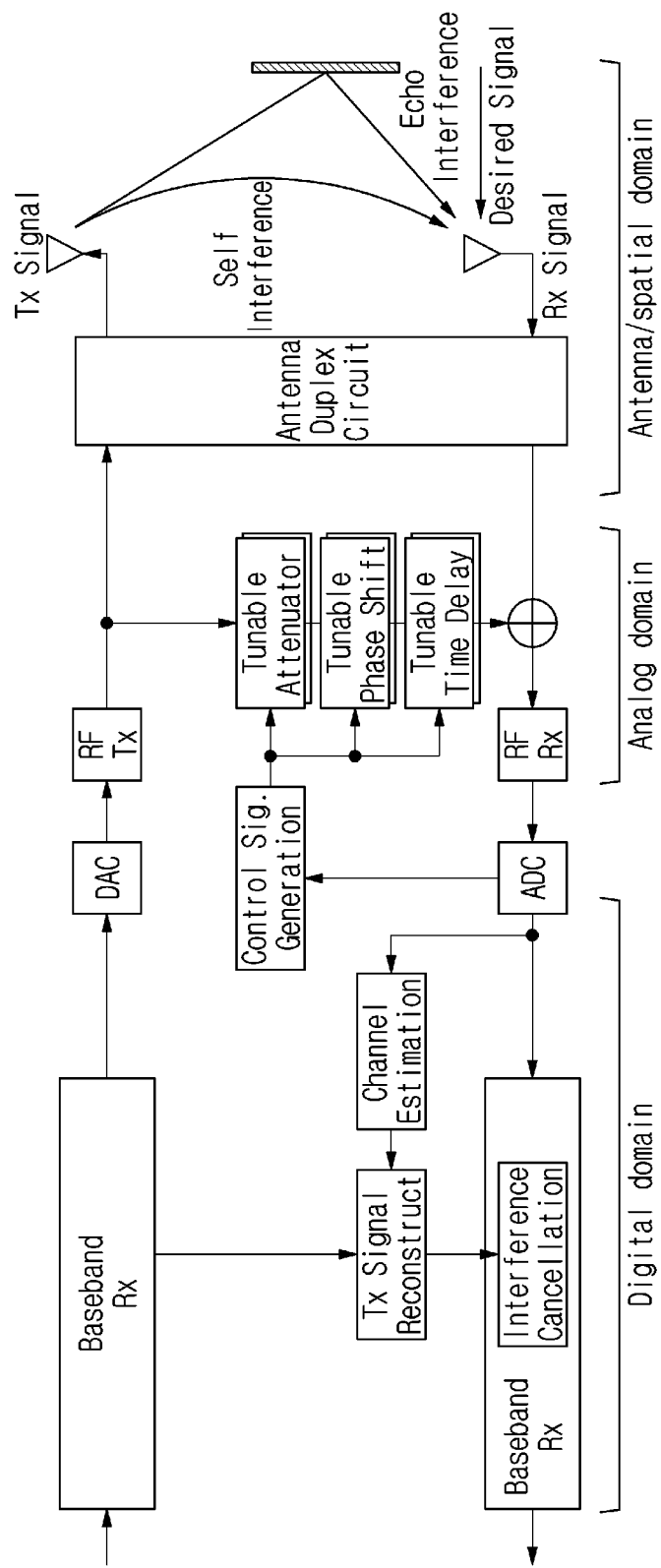
FIG. 16 illustrates an example of a transceiver having a self-interference control function according to an embodiment of the present disclosure.

In order to perform communication in the FD mode, sufficient antenna self-interference cancellation performance and analog self-interference cancellation performance are required in a front stage of an ADC. In order to ensure such analog-SIC performance, how to tune the parameters of the analog-SIC module has been studied. FIG. 16 shows an example of a transceiver to which an analog-SIC module structure is added.

FIG. 16 illustrates an example of a transceiver having a self-interference control function according to an embodiment of the present disclosure. Referring to FIG. 16, a controller may be an example of a tracking algorithm for forming an analog-SIC channel by calibrating appropriate initial values of an attenuator, a phase shifter and a time delay unit and updating the parameters of the analog-SIC module to minimize errors of the generated analog-SIC signal and the SI signal.

However, the SI channel has a time-variant characteristic and the SI channel may be changed according to the surrounding environment. In this case, when the surrounding environment is rapidly changed, a situation in which the change of the SI channel may not be followed by only the tracking algorithm may occur. Accordingly, a re-calibration process is required. In order to perform re-calibration, a test signal is required. When a UE arbitrarily transmits a signal for calibration for the analog-SIC, the signal may work as interference in a base station and other adjacent UEs.

When the calibration procedure is performed during uplink communication, an interference problem may be solved. However, since a re-calibration procedure is not defined, it is difficult to predict how long it takes to perform calibration. In addition, a base station and a UE should operate in a half-duplex mode while calibration is performed, spectral efficiency may be decreased as compared to the full-duplex mode. In order to solve such a problem, it is necessary to define a procedure for how to perform calibration between the base station and the UE.

Calibration according to the embodiment of the present disclosure is performed according to deterioration of SIC performance. Accordingly, since it is assumed that initial calibration is performed, the term re-calibration is used. That is, re-calibration means additional calibration and is not different from the initial calibration in an aspect of operations. Accordingly, in the present disclosure, "re-calibration" and "calibration" may be used interchangeably.

The present disclosure proposes various embodiments of sharing the start and end of a duration or a period for performing calibration between a base station and a UE (hereinafter referred to as a "calibration duration") and switching the full-duplex mode and the half-duplex mode based on the calibration duration. The operation method of the UE and the base station according to the proposed procedure are shown in FIGS. 17 and 18.

Figure 17:
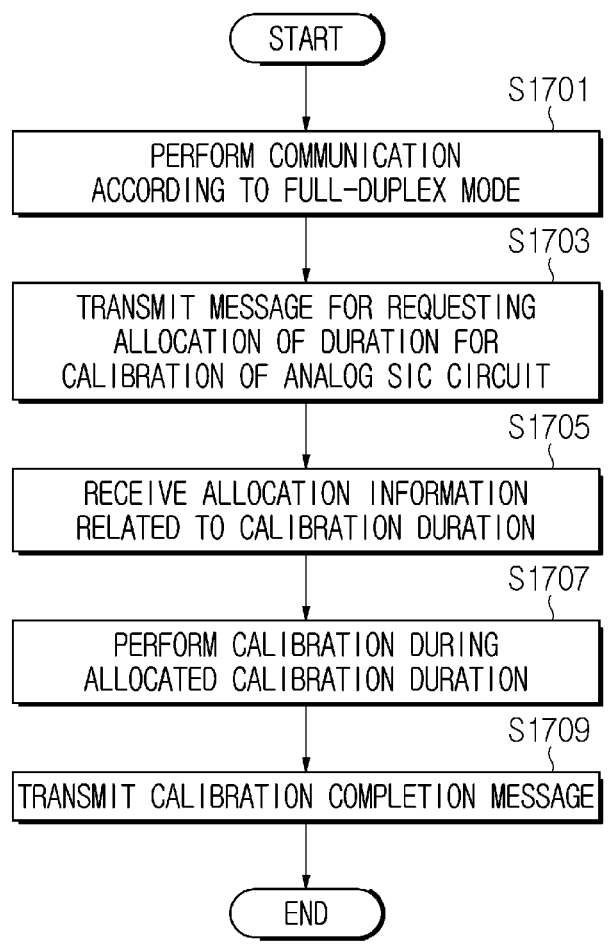
FIG. 17 illustrates an embodiment of an operation procedure of a UE for performing calibration according to an embodiment of the present disclosure.
Figure 18:
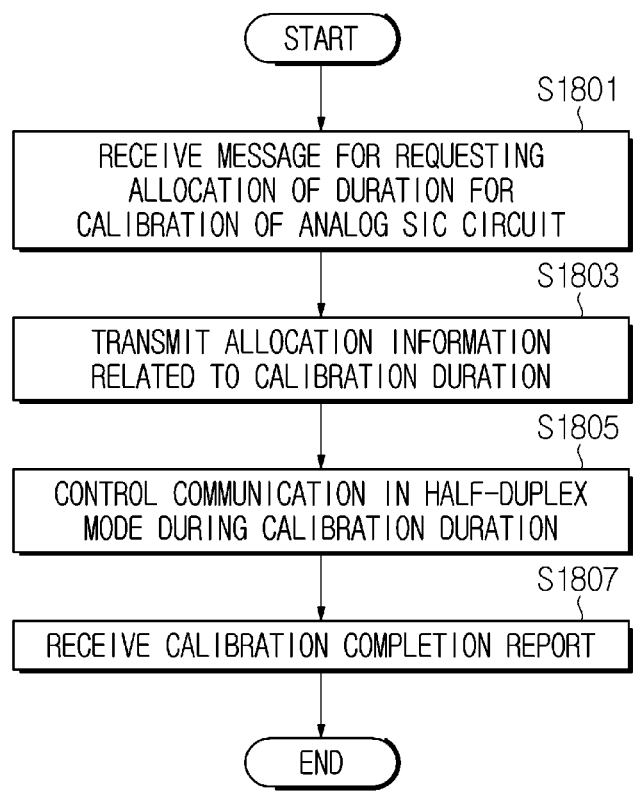
FIG. 18 illustrates an embodiment of an operation procedure of a base station supporting calibration of a UE according to an embodiment of the present disclosure.

FIG. 17 illustrates an embodiment of an operation procedure of a UE for performing calibration according to an embodiment of the present disclosure. FIG. 17 exemplifies a method performed by the UE.

Referring to FIG. 17, in step S1701, a UE performs communication according to the full-duplex mode. That is, the UE performs transmission operation and reception operation through at least partially same time-frequency resources under control of a base station. In other words, resources for signal transmission and resources for signal reception at least partially overlap. Although not shown in FIG. 17, prior to this procedure, the UE performs calibration for an SIC circuit and, more particularly, an analog SIC circuit, and then cancel a self-interference signal using the calibrated analog SIC circuit while performing communication. In addition, while communication is performed, the UE may adjust operation parameters of the analog SIC circuit based on a tracking algorithm.

In step S1703, the UE transmits a message for requesting allocation of a duration for calibration of the analog SIC circuit, that is, a calibration duration. Here, the calibration duration is a resource duration occupying a certain time and may be a dedicated duration defined for calibration or a duration defined for any other purpose. According to an embodiment, the calibration duration may include uplink resources. In this case, the UE may transmit a message (e.g., scheduling request (SR)) for requesting an uplink grant. According to another embodiment, the calibration duration may include resource for coordinating interference with another device (e.g., another UE adjacent to the UE).

In step S1705, the UE receives allocation information related to the calibration duration. According to an embodiment, in case that uplink resources are allocated as the calibration duration, the base station may transmit DCI for allocating uplink resources. According to another embodiment, when a dedicated duration for calibration is allocated, the base station transmits information indicating the location of the resource (e.g., a slot location or a subchannel/resource block location). In this case, unlike the DCI for allocating the uplink resource, information for data transmission such as MCS level may be excluded. If the location of the resource is determined by a predetermined rule from an allocation information transmission time point, the location information related to the resource included in the allocation information related to the calibration duration may be replaced with an indicator allowing the start of calibration.

In step S1707, the UE performs calibration during the calibration duration. That is, the UE generates and transmits a test signal and estimates a self-interference channel based on the test signal input to a reception circuit. In addition, the UE may determine a setting value of components (e.g., an attenuator, a time delay unit, a phase shifter, etc.) of an analog SIC circuit based on the estimated self-interference channel. During the calibration duration, the UE may operate in the half-duplex mode under control of the base station. If calibration is not completed during the allocated calibration duration, the UE may extend the calibration duration, by requesting allocation of an additional calibration duration.

In step S1709, the UE transmits a calibration completion message. By the calibration completion message, the UE may operate in a full-duplex mode under control of the base station. That is, the calibration completion message indicates the end of the calibration duration and indicates that operation may be performed in the full-duplex mode. Therefore, thereafter, the UE may operate in the full-duplex mode. In this case, self-interference is canceled using the analog SIC circuit reset through calibration.

FIG. 18 illustrates an embodiment of an operation procedure of a base station supporting calibration of a UE according to an embodiment of the present disclosure. FIG. 18 exemplifies a method performed by the base station.

Referring to FIG. 18, in step S1801, the base station receives a message for requesting allocation of a duration for calibration of an analog SIC circuit. Here, the calibration duration is a resource duration occupying a certain time and may be a duration defined for calibration or a duration defined for another purpose. According to an embodiment, when uplink resources are used as the calibration duration, the base station may receive a message (e.g., scheduling request (SR) for requesting an uplink grant. According to another embodiment, a calibration duration may include resource for coordinating interference between a UE and a another device (e.g., another UE adjacent to the UE). For example, the base station may exclude, from scheduling, uplink transmission of another UE associated with the same reception beam and downlink transmission from a UE to a neighboring UE during the calibration duration.

In step S1803, the base station transmits allocation information related to the calibration duration. According to an embodiment, when uplink resources are allocated as the calibration duration, the base station may transmit DCI for allocating uplink resources. According to another embodiment, when a dedicated duration for calibration is allocated, the base station transmits information indicating a resource location (e.g., a slot location or a subchannel/resource block location). In this case, unlike the DCI for allocating the uplink resource, information for data transmission such as MCS level may be excluded. If the location of the resource is determined by a predetermined rule from an allocation information transmission time point, the location information related to the resource included in the allocation information related to the calibration duration may be replaced with an indicator allowing the start of calibration.

In step S1805, the base station controls communication with the UE in the half-duplex mode during the calibration duration. In other words, while calibration is performed, the base station does not allow at least partially overlapping uplink resource and downlink resource to the UE. In this case, the calibration duration may extend by reallocation according to the request of the UE.

In step S1807, the base station receives a calibration completion report. By the calibration completion message, the base station may perform control such that the UE operates in the full-duplex mode. That is, the calibration completion message indicates the end of the calibration duration and indicates that operation may be performed in the full-duplex mode.

According to the above-described embodiments, the base station and the UE may confirm starting and ending of the calibration duration through signaling. Accordingly, the base station and the UE may temporarily operate in the half-duplex mode while calibration is performed, thereby preventing spectral efficiency from deteriorating and rapidly completing calibration. Here, the calibration may be referred to as various terms "calibration resource duration", "calibration gap" and "calibration resource".

In the above-described embodiments, the UE requests allocation of the calibration duration. However, whether or not calibration is performed may be determined by the UE or the base station. That is, the calibration procedure according to various embodiments may be classified into a base station-driven procedure and a UE-driven procedure. Hereinafter, detailed embodiments according to the subject initiating the procedure will be described.

Figure 19:
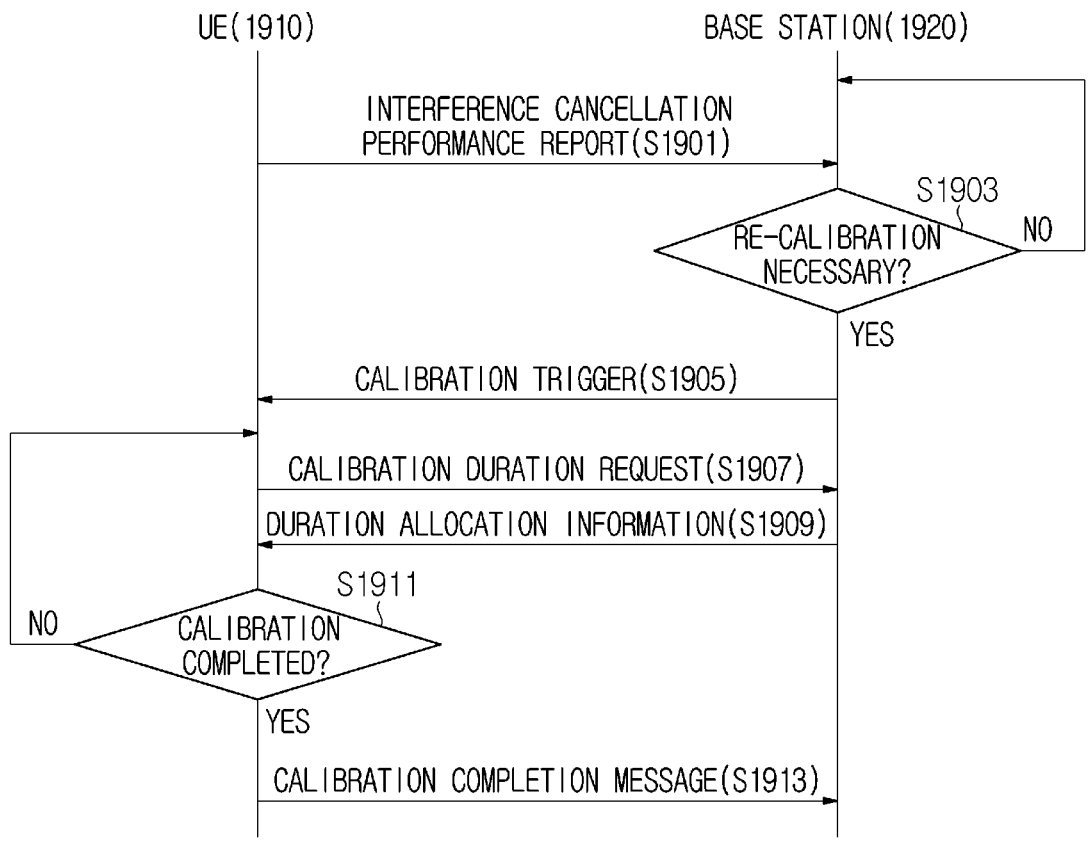
FIG. 19 illustrates an embodiment of a BS-driven calibration procedure according to an embodiment of the present disclosure.

FIG. 19 illustrates an embodiment of a BS-driven calibration procedure according to an embodiment of the present disclosure. FIG. 19 shows signal exchange between a UE 1910 and a base station 1920.

Referring to FIG. 19, in step S1910, the UE 1910 transmits an interference cancellation performance report to the base station 1920. The interference cancellation performance report may include analog-SIC performance and total SIC performance. Here, the total SIC performance means a sum of antenna SIC, analog-SIC and digital-SIC. The reason why the total SIC performance is reported is because, even if analog-SIC performance is lowered, when the total SIC performance is not changed by increase in other SIC (e.g., digital SIC or antenna SIC) performance, re-calibration is not required. Operation of step S1901 may be performed periodically or when performance change of a certain level or more occurs.

According to an embodiment, information on the total SIC performance may be transmitted through UCI. To this end, a UCI field for reporting the total SIC performance may be defined. Each field may include an index value meaning dB or performance. When multiple input multiple output (MIMO) is applied, SIC performance may vary according to the transmit port and the receive port. In order to distinguish between the ports, the SIC performance report according to the transmit/receive port is possible by specifying a transmit port index m and a receive port index n. For example, the UCI may include at least one of the fields shown in Table 2.

TABLE 2

| Attributes | Value |
| --- | --- |
| MaxNumberTXport | m - Integer (1 . . . 128) |
| MaxNumberRXport | n - Integer (1 . . . 128) |
| Analog_SIC_performance[m][n] | 0~255 (integer) |
| Total_SIC_performance[m][n] | 0~255 (integer) |

In Table 2, two fields (e.g., Analog_SIC_performance[m][n], 'Total_SIC_performance[m][n]) indicating performance may be repeated according to various combinations of [m][n] and each field may be set to a value from 0 to 225, inclusive.

In step S1903, the base station 1920 determines whether re-calibration is necessary, that is, whether calibration needs to be performed. The base station 1920 may determine whether calibration is necessary based on the interference cancellation performance reported from the UE 1910. According to an embodiment, when the value of the reported analog-SIC performance and total SIC performance is equal to or less than a threshold, the base station 1920 may determine that calibration is performed. Table 3 below shows an example of target performance. In Table 3, each value means an index corresponding to a dB unit or performance.

TABLE 3

| Attributes | Value |
| --- | --- |
| Analog-SIC target performance | 30 |
| Total-SIC target performance | 90 |

Upon determining that re-calibration is necessary, in step S1905, the base station 1920 transmits a calibration trigger signal. According to an embodiment, the base station 1920 may transmit the calibration trigger signal using an RRC message. According to another embodiment, the base station 1920 may transmit the calibration trigger signal using DCI. As the calibration trigger signal is transmitted, the base station 1920 changes the operation mode for communication with the UE 1910 from the full-duplex mode to the half-duplex mode.

According to an embodiment, when an RRC message is used, a message corresponding to a trigger signal may be included in RF-parameters of UE capability information elements (IEs). In the case of MIMO, m×n analog SI signals may be generated. Accordingly, for an analog SIC channel having performance of a threshold or less among m×n SI channels, a re-calibration trigger signal is transmitted. In this case, the RRC message may include the parameters shown in Table 4 below.

TABLE 4

RF-Parameters ::={
...
ReCalibrationTriggerEvent[m][n]   enum {true, false}
...
}

Since the SI channel is aperiodically changed, according to an embodiment, DCI may be used for rapid control. To this end, a DCI field for re-calibration may be defined. For example, a field defined as a trigger concept of performing the calibration process only once is shown in Table 5 below.

TABLE 5

| Attributes | Value |
| --- | --- |
| ReCalibration_trig[m][n] | 0→1: function as edge trigger. Start Re-calibration process<br>other: No Operation |

As another example, a DCI field defined as an on/off concept of a re-calibration process may be defined as shown in Table 6 below.

TABLE 6

| Attributes | Value |
| --- | --- |
| ReCalibration_flag[m][n] | 1: Re-calibration process on<br>0: Re-calibration process off |

In step S1907, the UE 1910 transmits a calibration duration request to the base station 1920. The calibration duration may include a resource duration defined for calibration or a resource duration defined for another purpose. According to an embodiment, the calibration duration request may include information related to a required minimum time length. For example, as the calibration duration, uplink resources may be used. In this case, the UE 1910 may request an uplink grant from the base station 1920 in order to perform calibration. In this case, any type of uplink channel and signal may be used.

In step S1909, the base station 1920 transmits allocation information related to the calibration duration to the UE 1910. That is, the base station 1920 allocates the calibration duration, and transmits information indicating allocated resources to the UE 1910. When uplink resources are used, the base station 1920 may transmit DCI including a uplink grant. Therefore, although not shown in FIG. 19, the UE 1910 performs calibration for the analog-SIC circuit during the allocated calibration duration.

In step S1911, the UE 1910 determines whether calibration is completed. That is, at a completion time point of the calibration duration, the UE 1910 determines whether calibration is completed. Whether calibration is completed may be determined based on SIC performance. If calibration is not completed, steps S1907 and S1919 are performed again. That is, the UE 1910 transmits the calibration duration request again, and, after the base station 1920 allocates the calibration duration, the UE 1910 may continuously perform calibration operation.

When calibration is completed through the above-described steps, in step S1913, the UE 1910 transmits a calibration completion message to the base station 1920. That is, the UE 1910 reports completion of the calibration to the base station 1920. As the calibration completion report message is received, the base station 1920 changes the operation mode with the UE 1910 from the half-duplex mode to the full-duplex mode. The calibration completion message may be defined as shown in Table 7 below.

TABLE 7

RF-Parameters ::={
...
CalibrationDone   enum {true, false}
...
}

As described with reference to FIG. 19, calibration of the UE may be performed under control of the base station. In the embodiment of FIG. 19, the UE, which has completed calibration, transmits a calibration completion report message. However, in another embodiment, transmission of the calibration completion report message may be omitted. In this case, the base station may determine completion of calibration, by confirming that the interference cancellation performance reported from the UE is improved to be equal to or greater than the threshold.

Figure 20:
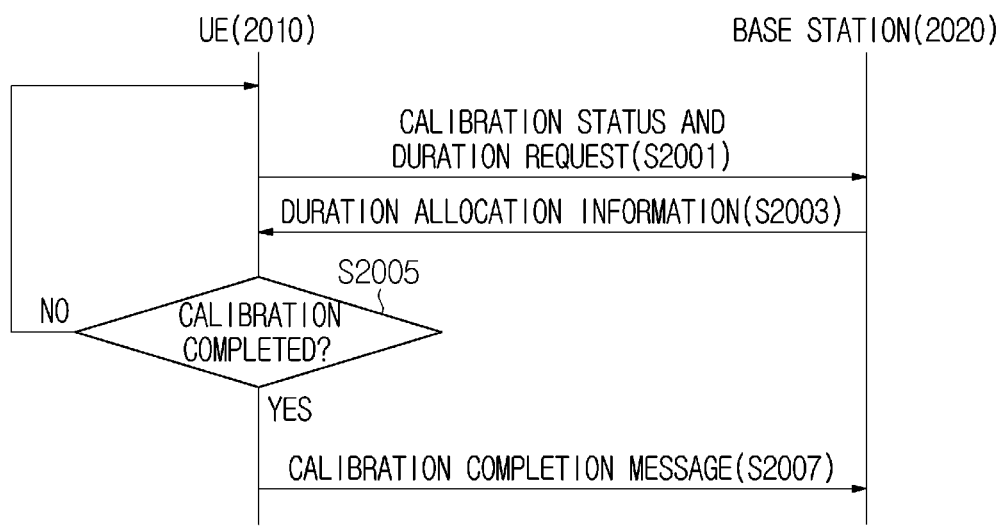
FIG. 20 illustrates an embodiment of a UE-driven calibration procedure according to an embodiment of the present disclosure.

FIG. 20 illustrates an embodiment of a UE-driven calibration procedure according to an embodiment of the present disclosure. FIG. 20 shows signal exchange between a UE 2010 and a base station 2020.

Referring to FIG. 20, in step S2001, the UE 2010 transmits calibration status information and calibration duration request to the base station 2020. That is, unlike the example of FIG. 19, whether recalibration is necessary is determined by the UE 2010. Accordingly, no operation is required to report SIC performance. The calibration status information is transmitted to inform that the UE 2010 will perform calibration. According to an embodiment, the calibration status information may be transmitted through UCI. The calibration status information may be defined as shown in FIG. 8.

TABLE 8

| Attributes | Value |
| --- | --- |
| ReCalibration_status | 1: Full duplex → switch to half duplex mode, allocate UL signal for Re-Calibration<br>0: Half duplex → switch to Full duplex mode, Re-Calibration success |

When MIMO is applied, the UE 2010 knows analog SIC performance of each transmit/receive port and determine whether to perform analog calibration for each port. Accordingly, in this case, unlike the embodiment of FIG. 19 in which determination is made by the base station, the UE 2010 may transmit only calibration status information without information related to each port. If the calibration duration is a dedicated duration defined for calibration, the calibration status information may be included in the calibration duration request.

In step S2003, the base station 2020 transmits allocation information related to the calibration duration to the UE 2010. That is, the base station 2020 may allocate a calibration duration and transmit information indicating allocated resources to the UE 2010. When uplink resources are used, the base station 2020 may transmit DCI including an uplink grant. Therefore, although not shown in FIG. 20, the UE 2010 performs calibration with respect to the analog-SIC circuit during the allocated calibration duration.

In step S2005, the UE 2010 determines whether calibration is completed. That is, at a completion time point of the calibration duration, the UE 2010 determines whether calibration is completed. Whether calibration is completed may be determined based on SIC performance. If calibration is not completed, calibration duration request operation of step S2001 and S2003 are performed again. That is, the UE 2010 transmits the calibration duration request again, and the base station 2020 allocates the calibration duration and then the UE 2010 continue to perform calibration operation.

When calibration is completed, in step S2007, the UE 2010 transmits a calibration completion message to the base station 2020. That is, the UE 2010 reports completion of calibration to the base station 2020. As a calibration completion report message is received, the base station 2020 changes the operation mode with the UE 2010 from the half-duplex mode to the full-duplex mode.

In the embodiment described with reference to FIG. 20, the calibration status information is used to operate the analog-SIC module of the UE in the half-duplex mode during calibration. When there is no calibration status information, the base station may determine that the UE operates in the full-duplex mode and schedule downlink communication and uplink communication to the same resources. In this case, a downlink signal indicating the location of the next uplink resource may not be normally received due to self-interference and, as a result, next uplink communication cannot be performed. Therefore, re-calibration may fail.

As described with reference to FIG. 20, calibration may be performed under control of the UE. In the embodiment of FIG. 20, calibration is performed according to the determination of the UE. To this end, the UE requests a calibration duration, and the base station allocates a dedicated duration defined for calibration or an uplink resource duration according to the request of the UE. In this case, when the uplink resource duration is allocated, in order to clarify whether uplink resources are allocated for calibration, the base station may explicitly or implicitly signal that the uplink resources are resources for calibration.

Figure 21A:
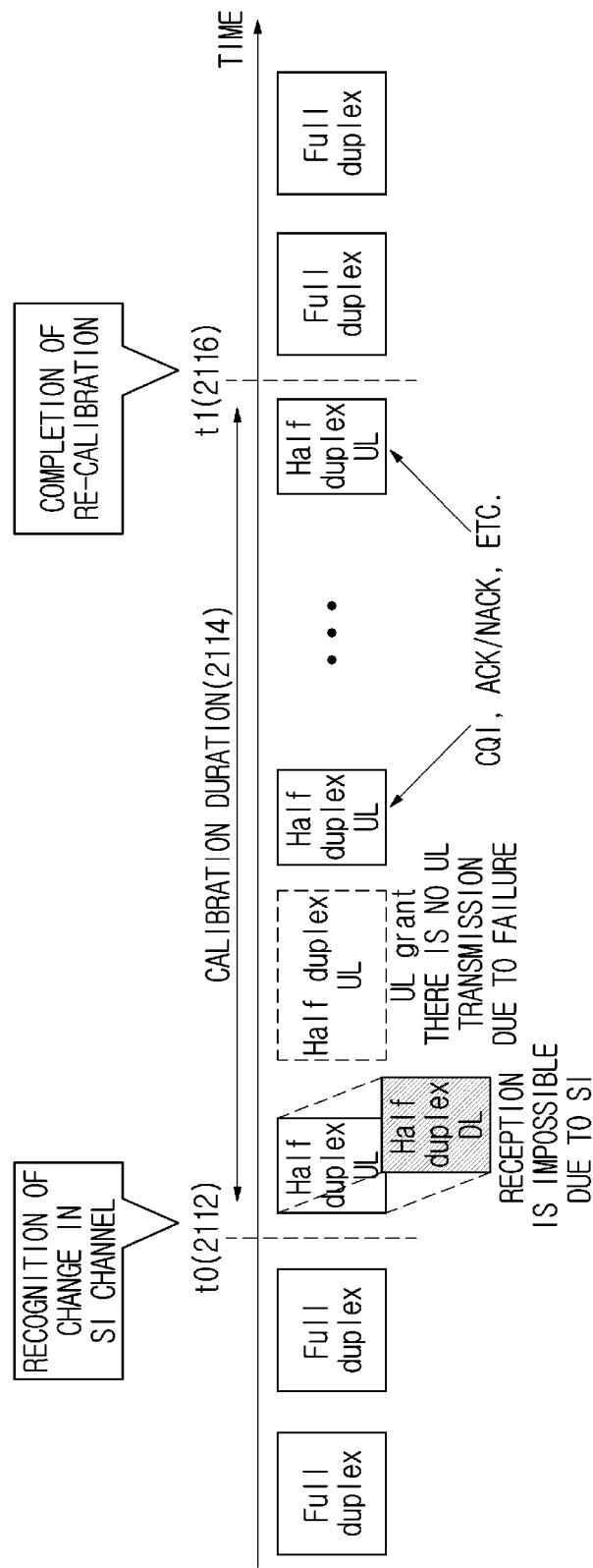
FIGS. 21A and 21B illustrate calibration procedures of the cases where an allocated duration is not used and is used, according to an embodiment of the present disclosure.
Figure 21B:
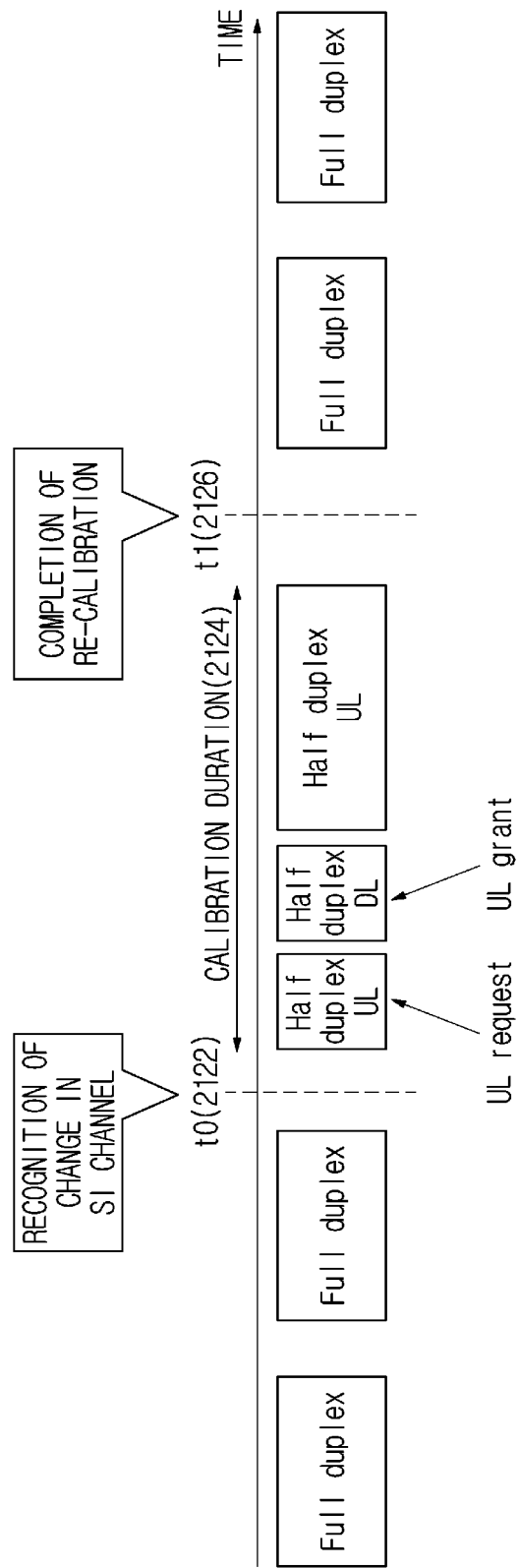

FIGS. 21A and 21B illustrate calibration procedures of the cases where an allocated duration is not used and is used, according to an embodiment of the present disclosure. FIG. 21A shows the case where the calibration duration is not allocated, and FIG. 21B shows the case where the calibration duration is allocated.

Referring to FIG. 21, the UE recognizes change in SI channel at a time t0 2112 and determines that re-calibration is necessary. However, unlike the various embodiments described above, the UE does not request allocation of a calibration duration and performs calibration during a calibration duration 2114 set thereby. Due to change in self-interference channel, downlink reception of the UE is not normally performed. Since the uplink grant is not separately requested, the UE performs calibration using an uplink signal (e.g., SRS or PUCCH) repeated periodically. In this case, it is impossible to know how long it takes to perform calibration and it is difficult for the UE to predict an end time t1 2116 of calibration.

Referring to FIG. 21B, procedures according to various embodiments are applied. The UE recognizes change in SI channel at a time t0 2122 and determines that re-calibration is necessary. The UE requests, from the base station, allocation of a calibration duration 2124 for calibration of an analog-SIC module. When the calibration duration 2124 is allocated as much as necessary for calibration is allocated, the UE performs calibration during the calibration duration 2124. In this case, the end time t1 2116 of calibration may be easily predicted and the UE may rapidly return to the full-duplex mode.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 22:
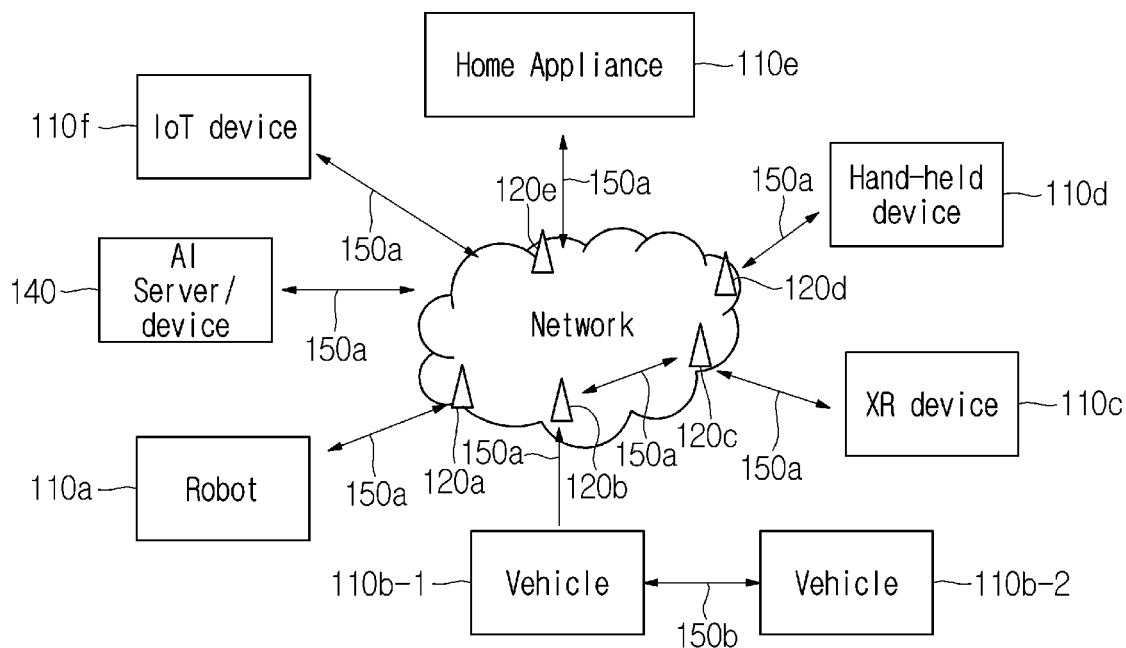
FIG. 22 illustrates an example of a communication system according to an embodiment of the present disclosure.

FIG. 22 illustrates an example of a communication system according to an embodiment of the present disclosure. The embodiment of FIG. 22 may be combined with various embodiments of the present disclosure.

Referring to FIG. 22, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110*a*, vehicles 110*b*-1 and 110*b*-2, an extended reality (XR) device 110*c*, a hand-held device 110*d*, a home appliance 110*e*, an Internet of Thing (IoT) device 110*f* or an artificial intelligence (AI) device/server 110*g*. For example, the vehicle may include a vehicle having a wireless communication function, an autonomous vehicle, a vehicle capable of performing vehicle-to-vehicle communication or the like. Here, the vehicles 110*b*-1 and 110*b*-2 may include an unmanned aerial vehicle (UAV) (e.g., drone). The XR device 110*c* may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110*d* may include a smartphone, a smart pad, a wearable device (e.g., a smartwatch or smart glasses), a computer (e.g., a laptop, etc.), etc. The home appliance 110*e* may include a TV, a refrigerator, a washing machine, etc. The IoT device 110f may include a sensor, a smart meter, etc. For example, the base stations 120a to 120e and the network may be implemented by a wireless device, and the specific wireless device 120a may operate as a base station/network node for the other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110a to 110f of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110a to 110f of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (JAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various pur-poses of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 23:
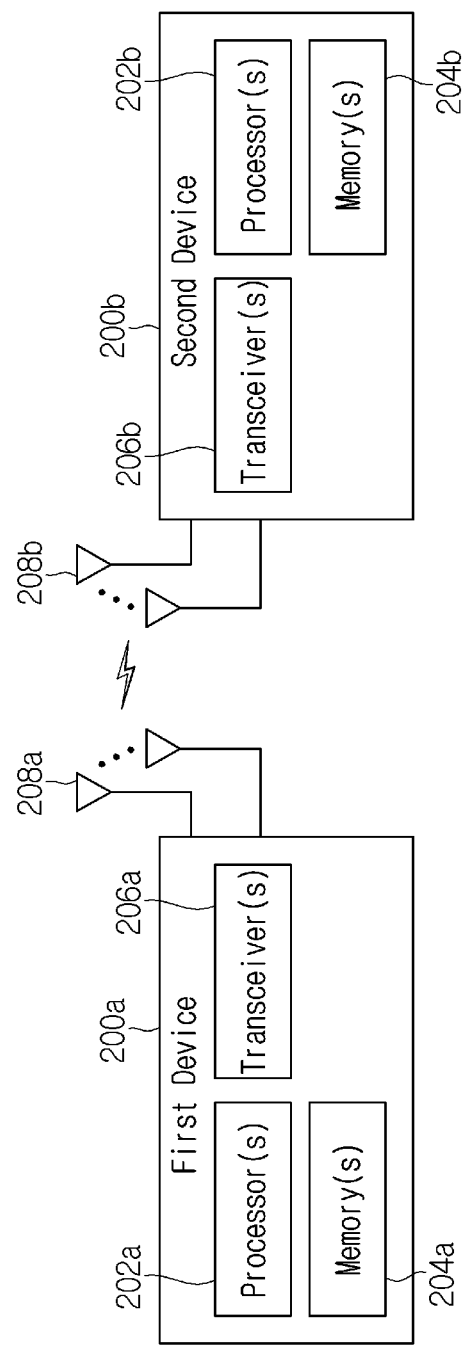
FIG. 23 illustrates an example of a wireless device according to an embodiment of the present disclosure.

FIG. 23 illustrates an example of a wireless device according to an embodiment of the present disclosure.

Referring to FIG. 23, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a The memory 204a may be connected to the processor 202a to store a variety of information related to operation of the processor 202a For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 24:
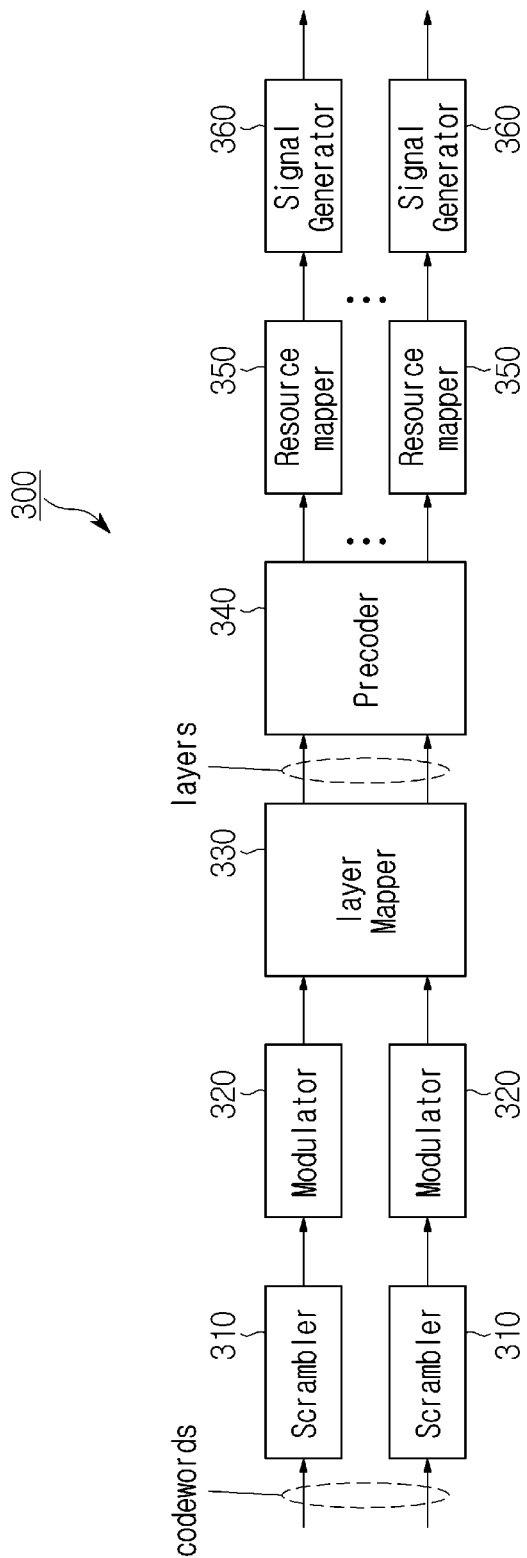
FIG. 24 illustrates a circuit for processing a transmitted signal according to an embodiment of the present disclosure.

FIG. 24 illustrates a circuit for processing a transmitted signal according to an embodiment of the present disclosure. The embodiment of FIG. 24 may be combined with various embodiments of the present disclosure.

Referring to FIG. 24, a signal processing circuit 300 may include a scrambler 310, a modulator 320, a layer mapper 330, a precoder 340, a resource mapper 350 and a signal generator 360. In this case, for example, the operation/function of FIG. 24 may be performed by the processors 202a and 202b and/or the transceivers 206a and 206b of FIG. 23. In addition, for example, the hardware element of FIG. 24 may be implemented in the processors 202a and 202b and/or the transceivers 206a and 206b of FIG. 23. For example, blocks 310 to 360 may be implemented in the processors 202a and 202b of FIG. 23. Alternatively, the blocks 310 to 350 may be implemented in the processors 202a and 202b of FIG. 23 and the block 360 may be implemented in the transceivers 206a and 206b of FIG. 23, without being limited to the above-described embodiment.

The codeword may be converted into a radio signal through the signal processing circuit 300 of FIG. 24. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 24. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK (pi/2-binary phase shift keying), m-PSK (m-phase shift keying), m-QAM (m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT)

with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 24. For example, the wireless device (e.g., 200a and 200b of FIG. 23) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a de-scrambler and a decoder.

Figure 25:
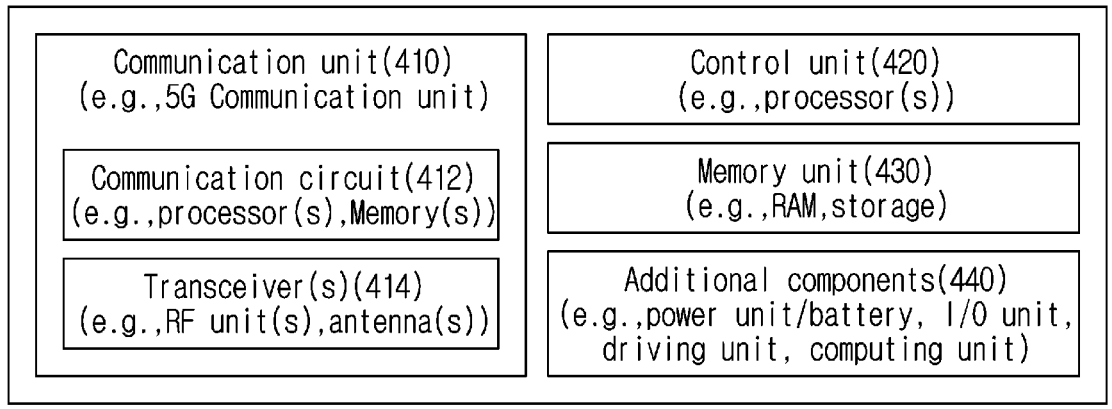
FIG. 25 illustrates another example of a wireless device according to an embodiment of the present disclosure.

FIG. 25 illustrates another example of a wireless device according to an embodiment of the present disclosure. The embodiment of FIG. 25 may be combined with various embodiments of the present disclosure.

Referring to FIG. 25, the wireless device 300 corresponds to the wireless devices 200a and 200b of FIG. 23 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202a and 202b and/or the one or more memories 204a and 204b of FIG. 23. For example, the transceiver(s) 414 may include the one or more transceivers 206a and 206b and/or the one or more antennas 208a and 208b of FIG. 23.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110a), a vehicle (FIG. 1, 110b-1 and 110b-2), an XR device (FIG. 1, 110c), a hand-held device (FIG. 1, 110d), a home appliance (FIG. 1, 110e), an IoT device (FIG. 1, 110f), a digital broadcast terminal, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 26:
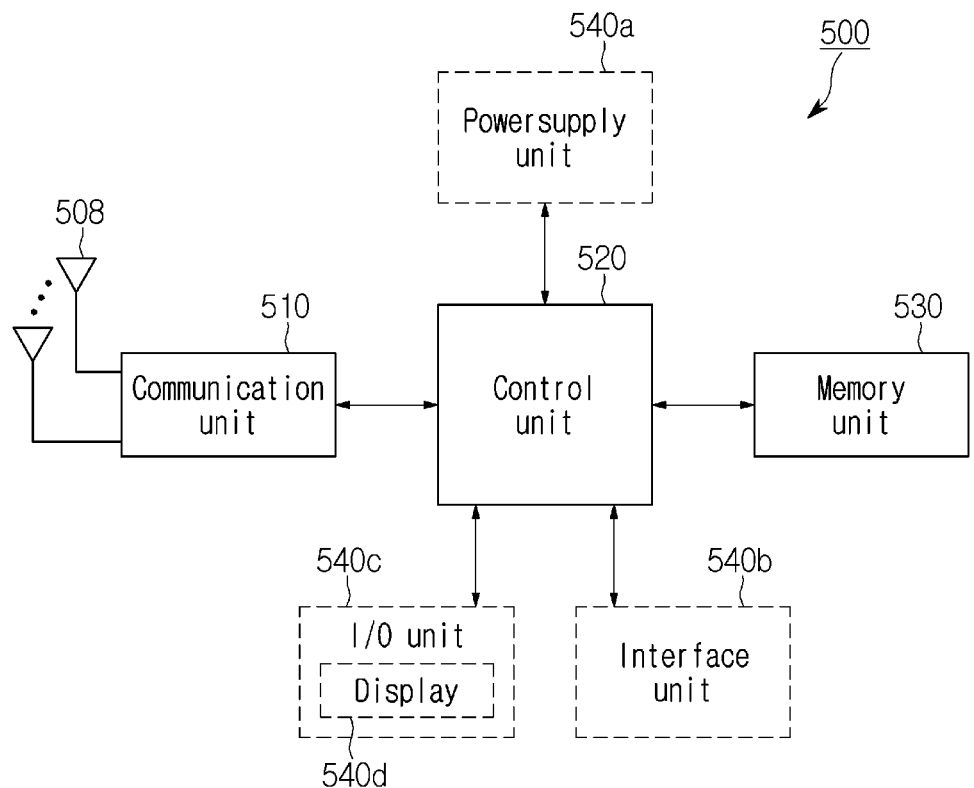
FIG. 26 illustrates an example of a hand-held device according to an embodiment of the present disclosure.

FIG. 26 illustrates an example of a hand-held device according to an embodiment of the present disclosure. FIG. 26 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 26 may be combined with various embodiments of the present disclosure.

Referring to FIG. 26, the hand-held device 500 may include an antenna unit 508, a communication unit 510, a control unit 530, a power supply unit 540a, an interface unit 540b and an input/output unit 540c. The antenna unit 508 may be a portion of the communication unit 510. Blocks 510 to 530/540a to 540c may respectively correspond to the blocks 410 to 430/440 of FIG. 25 and a repeated description thereof will be omitted.

The communication unit 510 may transmit and receive signals, the control unit 520 may control the hand-held device 500, and the memory unit 530 may store data, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output image video information/signals, audio information/signals, data and/or information received from a user. The input/output unit 540c may include a camera, a microphone, a user input unit, a display 540d, a speaker and/or a haptic module.

For example, in the case of data communication, the input/output unit 540c may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 27:
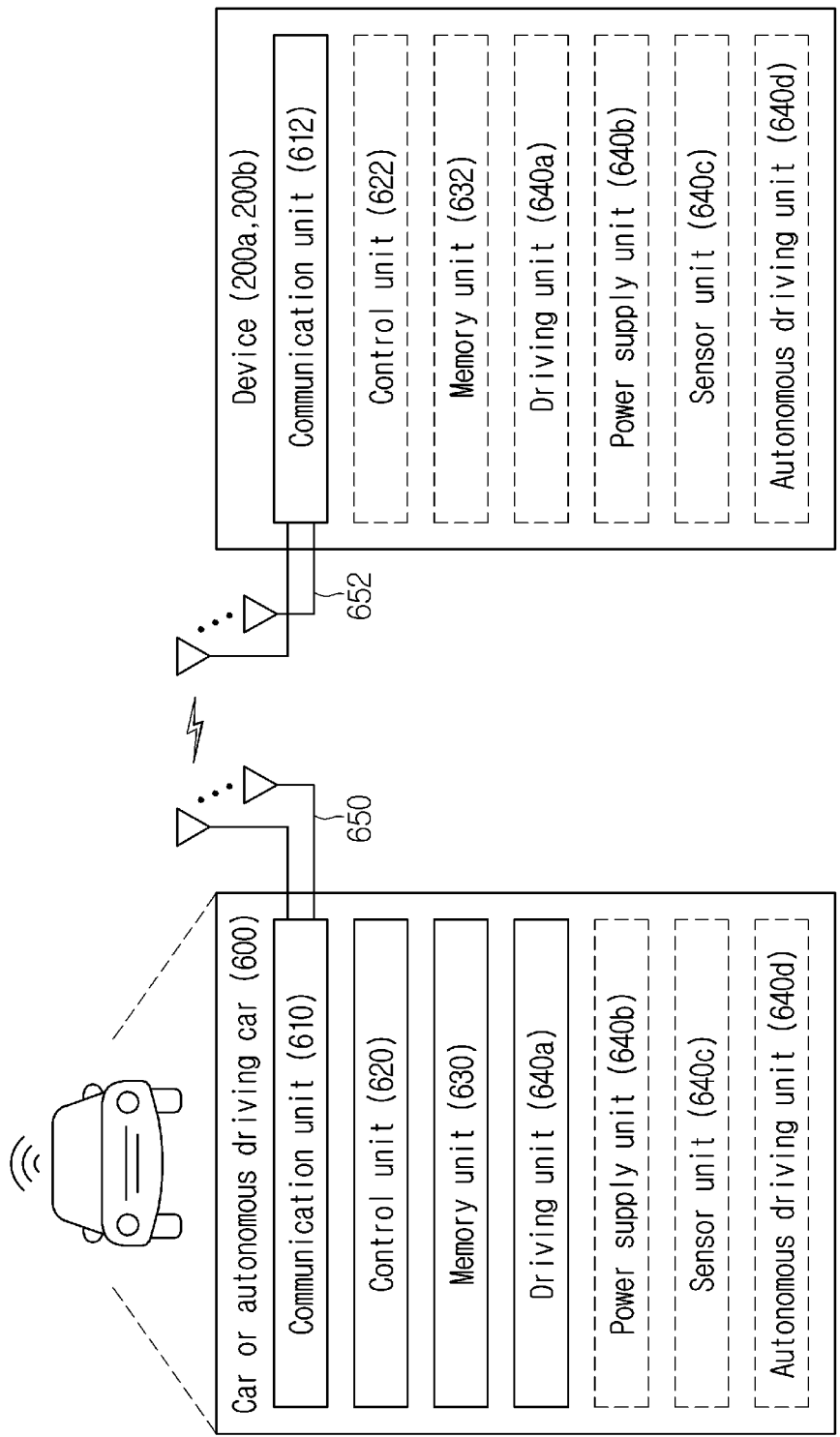
FIG. 27 illustrates an example of a vehicle or an autonomous vehicle according to an embodiment of the present disclosure.

FIG. 27 illustrates an example of a vehicle or an autonomous vehicle according to an embodiment of the present disclosure. FIG. 27 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 27 may be combined with various embodiments of the present disclosure.

Referring to FIG. 27, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a~640d correspond to the blocks 510/530/540 of FIG. 26, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640a may cause the vehicle or the autonomous vehicle 600 to drive on a road. The driving unit 640a may include an engine, a motor, a powertrain, a wheel, a brake, a steering device, etc. The power supply unit 640b may supply power to the vehicle or the autonomous vehicle 600 and include a wired/wireless charging circuit, a battery, etc. The sensor unit 640c may obtain a vehicle state, ambient environment information, user information, etc. The sensor unit 640c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:
1. A method performed by a user equipment (UE) in a wireless communication system, the method comprising:
   performing communication with a base station;
   transmitting, to the base station, uplink control information (UCI);
   receiving, from the base station, downlink control information (DCI);
   transmitting, to the base station, a first message for requesting a uplink resource;
   receiving, from the base station, a second message for allocating the uplink resource;
   transmitting at least one signal on the uplink resource; and
   performing calibration of a circuit for analog self-interference cancellation (SIC) based on the at least one signal,
   wherein the UCI includes at least one of first information related to performance of the analog SIC, second information related to performance of total SIC, third information related to a maximum number of transmit ports or fourth information related to a maximum number of receive ports, wherein the first information includes a plurality of values related to the performance of the analog SIC for a plurality of pairs of a transmit port and a receive port, wherein the first message includes information related to a required minimum time length for the calibration, and wherein the second message includes an indication informing that the uplink resource comprises a resource for the calibration.

2. The method of claim 1, further comprising:
receiving, from the base station, a third message for triggering the calibration.

3. The method of claim 2, wherein the third message includes information related to at least one pair of a transmit port and a receive port.

4. The method of claim 1, further comprising:
transmitting, to the base station, a fourth message indicating that the calibration is completed.

5. The method of claim 1, further comprising:
transmitting, to the base station, information related to a status of the calibration that requests to switch an operation mode from a full-duplex mode into a half-duplex mode.

6. The method of claim 1,
wherein the first message comprises a scheduling request for an uplink grant.

7. A method performed by a base station in a wireless communication system, the method comprising:
performing communication with a user equipment (UE);
receiving, from the UE, uplink control information (UCI);
transmitting, to the UE, downlink control information (DCI);
receiving, from the UE, a first message for requesting a uplink resource for calibration of a circuit for analog self-interference cancellation (SIC); and
transmitting, to the UE, a second message for allocating the uplink resource,
wherein the UCI includes at least one of first information related to performance of the analog SIC, second information related to performance of total SIC, third information related to a maximum number of transmit ports or fourth information related to a maximum number of receive ports,
wherein the first information includes a plurality of values related to the performance of the analog SIC for a plurality of pairs of a transmit port and a receive port,
wherein the first message includes information related to a required minimum time length for the calibration, and
wherein the second message includes indication informing that the uplink resource comprises a resource for the calibration.

8. The method of claim 7, further comprising:
transmitting, to the UE, a third message for triggering the calibration.

9. The method of claim 8, wherein the third message includes information related to at least one pair of a transmit port and a receive port.

10. The method of claim 7, further comprising:
receiving, from the UE, a fifth-fourth message indicating that the calibration is completed.

11. The method of claim 7, further comprising:
receiving, from the UE, information related to a status of the calibration that requests to switch an operation mode from a full-duplex mode into a half-duplex mode.

12. The method of claim 7,
wherein the first message comprises a scheduling request for an uplink grant.

13. A user equipment (UE) in a wireless communication system, the UE comprising:
a transceiver; and
a processor coupled to the transceiver and configured to:
perform communication with a base station;
transmit, to the base station, uplink control information (UCI);
receive, from the base station, downlink control information (DCI);
transmit, to the base station, a first message for requesting a uplink resource;
receive, from the base station, a second message for allocating the uplink resource;
transmit at least one signal on the uplink resource; and
perform a calibration of a circuit for analog self-interference cancellation (SIC) based on the at least one signal,
wherein the UCI includes at least one of first information related to performance of the analog SIC, second information related to performance of total SIC, third information related to a maximum number of transmit ports or fourth information related to a maximum number of receive ports,
wherein the first information includes a plurality of values related to the performance of the analog SIC for a plurality of pairs of a transmit port and a receive port,
wherein the first message includes information related to a required minimum time length for the calibration, and
wherein the second message includes an indication informing that the uplink resource comprises a resource for the calibration.

14. The UE of claim 13, wherein the processor is further configured to receive, from the base station, a third message for triggering the calibration.

15. The UE of claim 13, wherein the processor is further configured to transmit, to the base station, a fourth message indicating that the calibration is completed.

* * * * *